(12) United States Patent
Halpert

(10) Patent No.: US 12,416,565 B2
(45) Date of Patent: *Sep. 16, 2025

(54) METHODS AND SYSTEMS FOR CHARACTERIZING SPILLOVER SPREADING IN FLOW CYTOMETER DATA

(71) Applicant: Becton, Dickinson and Company, Franklin Lakes, NJ (US)

(72) Inventor: Richard Lee Halpert, Ashland, OR (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,020

(22) Filed: Apr. 19, 2024

(65) Prior Publication Data

US 2024/0280466 A1 Aug. 22, 2024

Related U.S. Application Data

(63) Continuation of application No. 18/139,664, filed on Apr. 26, 2023, now Pat. No. 11,988,592, which is a
(Continued)

(51) Int. Cl.
*G01N 15/1429* (2024.01)
*G01N 15/14* (2024.01)
(Continued)

(52) U.S. Cl.
CPC ..... *G01N 15/1429* (2013.01); *G01N 15/1425* (2013.01); *G06F 18/2163* (2023.01);
(Continued)

(58) Field of Classification Search
CPC ........... G01N 15/1429; G01N 15/1425; G01N 15/1459; G01N 2015/1402;
(Continued)

(56) References Cited

U.S. PATENT DOCUMENTS 6,897,954 B2 5/2005 Bishop et al.
7,613,583 B2 11/2009 Estevez-Labori
(Continued)

FOREIGN PATENT DOCUMENTS

JP 2008061969 A 3/2008
WO WO-2011106402 A1 * 9/2011 ......... G01N 15/1429

OTHER PUBLICATIONS

"Quantifying Spillover Spreading for Comparing Instrument Performance and Aiding in Multicolor Panel Design", Cytometry A. Mar. 2013; 83(3): 306-315.

*Primary Examiner* — Gordon J Stock, Jr.
(74) *Attorney, Agent, or Firm* — Bret E. Field; BOZICEVIC, FIELD & FRANCIS LLP

(57) ABSTRACT

Methods for characterizing spillover spreading originating from a first fluorochrome in fluorescent flow cytometer data collected for a second fluorochrome are provided. In some embodiments, methods include partitioning the fluorescent flow cytometer data according to the intensity of the data relative to the first fluorochrome. In embodiments, methods also include estimating with a first linear regression a zero-adjusted standard deviation for the intensity of light collected from the second fluorochrome for each of the partitioned quantiles based on the assumption that the intensity of light collected from the first fluorochrome is zero, and obtaining with a second linear regression a spillover spreading coefficient from the zero-adjusted standard deviations. Systems and computer-readable media for characterizing spillover spreading originating from a first fluorochrome in fluorescent flow cytometer data collected for a second fluorochrome are also provided.

24 Claims, 15 Drawing Sheets

Related U.S. Application Data continuation of application No. 17/237,504, filed on Apr. 22, 2021, now Pat. No. 11,674,879.

(60) Provisional application No. 63/076,611, filed on Sep. 10, 2020, provisional application No. 63/020,758, filed on May 6, 2020.

(51) Int. Cl.
  *G01N 21/64* (2006.01)
  *G06F 18/21* (2023.01)

(52) U.S. Cl.
  CPC ............. *G01N 2015/1402* (2013.01); *G01N 2021/6441* (2013.01); *G01N 2201/121* (2013.01)

(58) Field of Classification Search
  CPC ..... G01N 2015/1477; G01N 2015/149; G01N 2015/1006; G01N 2021/6441; G01N 2201/121; G06K 9/6261; G06K 9/6218; G06K 9/6232; G06F 18/2163
  See application file for complete search history.

(56) References Cited

U.S. PATENT DOCUMENTS

| | | |
|---|---|---|
| 8,779,387 B2 | 7/2014 | Rogers et al. |
| 10,371,639 B2 * | 8/2019 | Sekino ................. G16B 40/00 |
| 10,876,953 B2 | 12/2020 | Ren et al. |
| 11,009,400 B2 | 5/2021 | Mage et al. |
| 11,143,587 B2 | 10/2021 | Hage et al. |
| 11,181,464 B2 | 11/2021 | Petersen et al. |
| 11,506,593 B2 | 11/2022 | Halpert |
| 11,674,879 B2 | 6/2023 | Halpert et al. |
| 11,988,592 B2 * | 5/2024 | Halpert .............. G01N 15/1429 |
| 2010/0256943 A1 | 10/2010 | Donnenberg et al. |
| 2010/0302536 A1 | 12/2010 | Ball et al. |
| 2011/0204259 A1 | 8/2011 | Rogers et al. |
| 2012/0056103 A1 * | 3/2012 | Sakai ..................... G01N 21/64 |
| | | 250/459.1 |
| 2019/0353577 A1 | 11/2019 | Zhang |
| 2020/0132594 A1 | 4/2020 | Kapinsky |
| 2020/0319079 A1 | 10/2020 | Hage et al. |
| 2021/0239592 A1 | 8/2021 | Halpert |
| 2021/0404939 A1 * | 12/2021 | Hage .................. G01N 15/1425 |
| 2022/0108774 A1 * | 4/2022 | Seay .................. G01N 15/1429 |
| 2023/0384220 A1 * | 11/2023 | Umetsu .............. G01N 21/6428 |

* cited by examiner

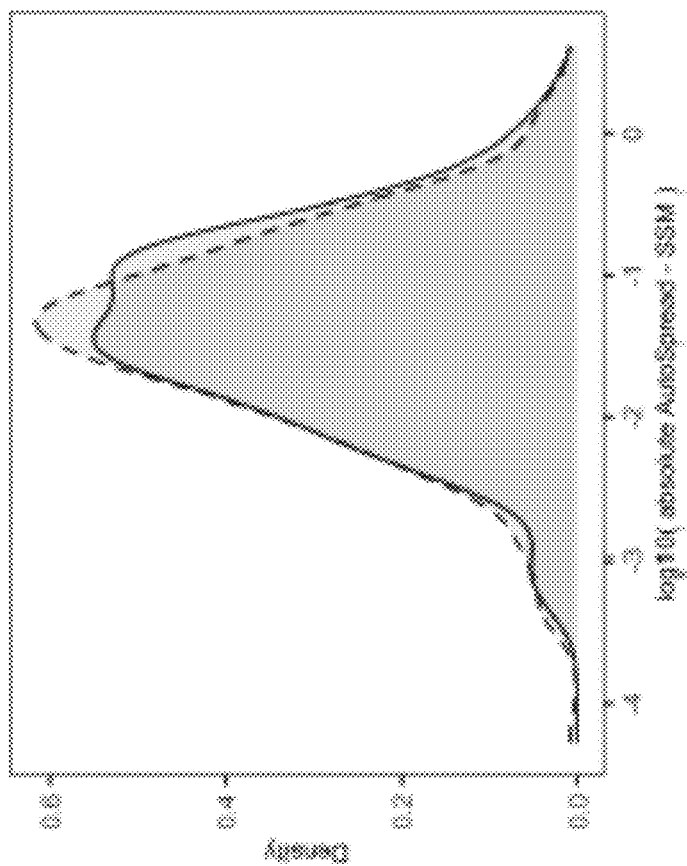
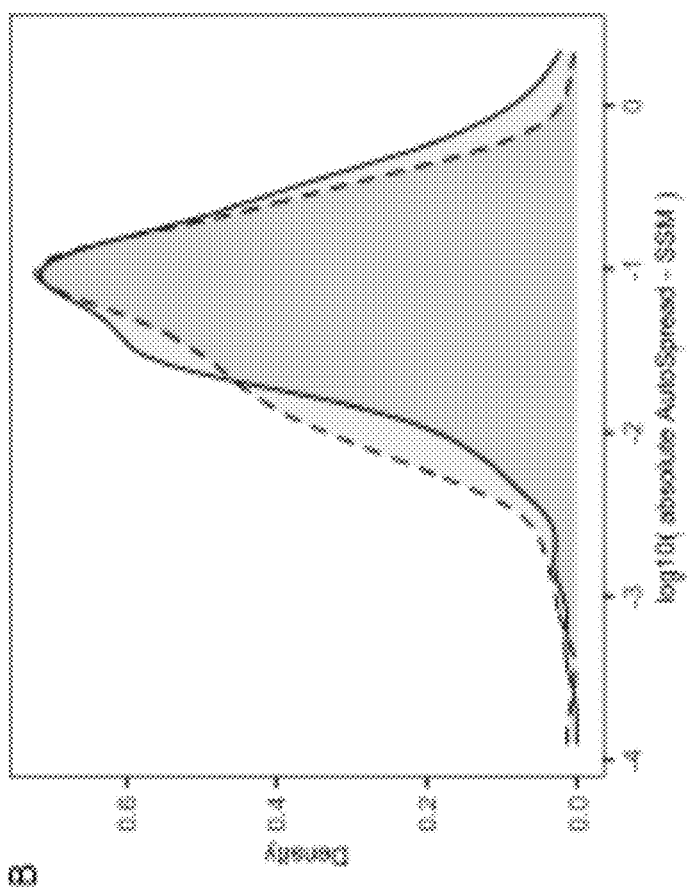
Figure 13

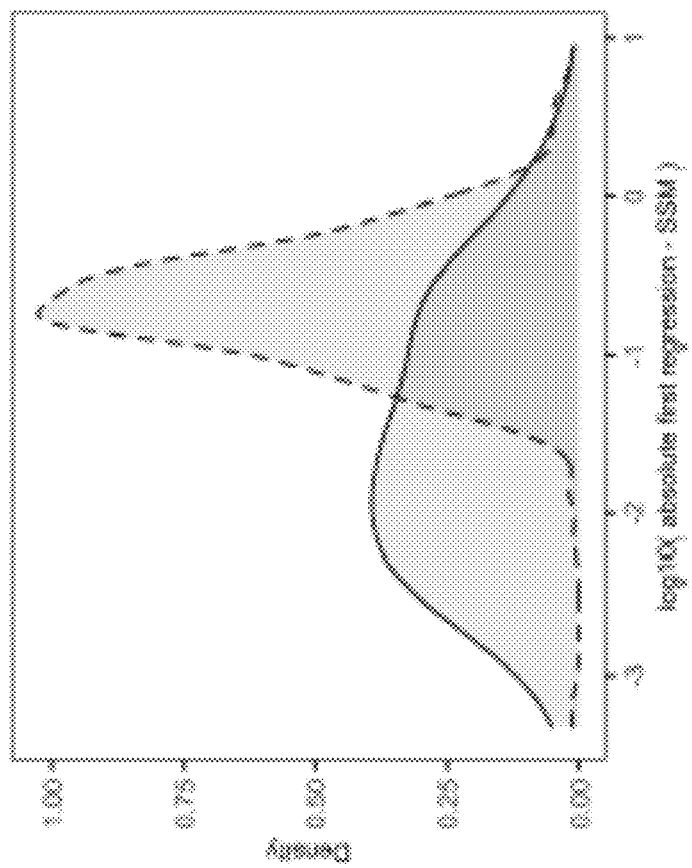
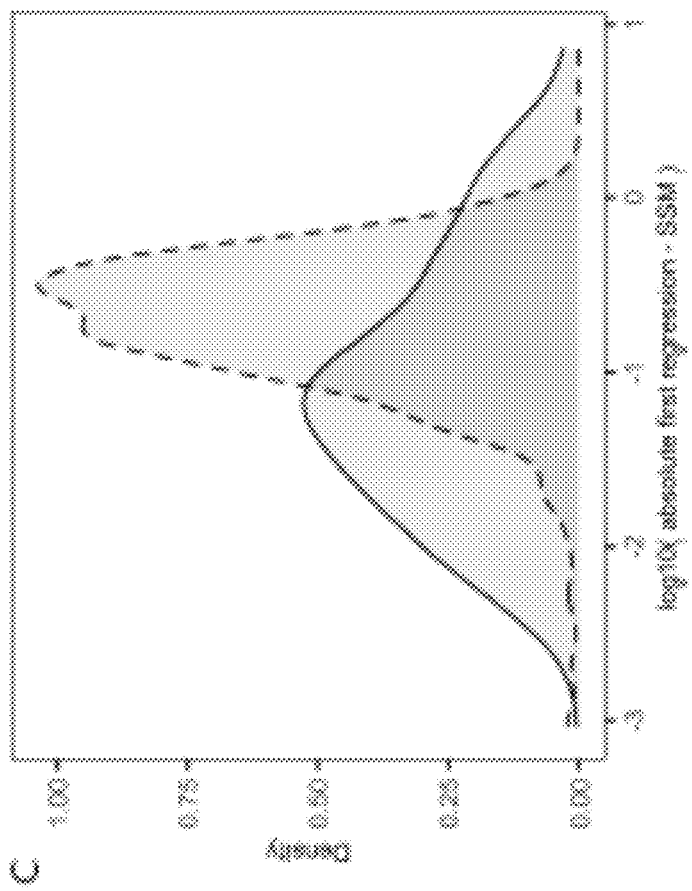
Figure 14

METHODS AND SYSTEMS FOR CHARACTERIZING SPILLOVER SPREADING IN FLOW CYTOMETER DATA

CROSS-REFERENCE

This application is a continuation of U.S. patent application Ser. No. 18/139,664 filed Apr. 26, 2023, which claims priority to U.S. patent application Ser. No. 17/237,504 filed Apr. 22, 2021, now granted U.S. Pat. No. 11,674,879, which application claims priority to U.S. Provisional Patent Application Ser. No. 63/020,758 filed May 6, 2020, and also claims priority to U.S. Provisional Patent Application Ser. No. 63/076,611 filed Sep. 10, 2020, the disclosures of which applications are incorporated herein by reference in their entirety.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. For example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of detectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Flow cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured features. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization, but other methods may be used to visualize multidimensional data.

The parameters measured using a flow cytometer typically include light at the excitation wavelength scattered by the particle in a narrow angle along a mostly forward direction, referred to as forward scatter (FSC), the excitation light that is scattered by the particle in an orthogonal direction to the excitation laser, referred to as side scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

After flow cytometer data is received from one or more detectors, it is often subjected to a data analysis process through which it can be made intelligible to the user. However, flow cytometer data analysis is often complicated by spillover, a phenomenon in which particle-modulated light indicative of a particular fluorochrome is received by one or more detectors that are not configured to measure that parameter. As such, light may "spillover" and be detected by off-target detectors. Spillover can be corrected by unmixing, in which new per-fluorochrome intensity values are calculated by solving a system of equations relating the fluorochrome intensity values to the measured detector values via the observed levels of spillover. Unmixing is often called "compensation" when the number of detectors is equal to the number of fluorochromes being unmixed. FIG. 1A depicts a flowchart demonstrating a conventional spillover compensation process. In step 101, populations of fluorescent flow cytometer data that are positive and negative for a particular fluorochrome are identified. In step 102, a fluorescence spillover matrix containing spillover coefficients quantifying the extent to which spillover adds signal to fluorescent flow cytometer data is calculated. In step 103, the fluorescent flow cytometer data is mathematically adjusted based on the fluorescence spillover matrix such that spillover is compensated for. Although unmixing corrects intensity contributions from each fluorochrome into each other fluorochrome, it cannot correct noise contributions, i.e., the error contributed to the fluorescent flow cytometer data by spillover. This noise is called "spillover spreading". In some instances, spillover spreading noise is constructive, which results in signal intensities that are higher than would otherwise be observed, while in other instances the noise is destructive, resulting in lower intensities.

Conventional methods for quantifying spillover spreading involve the calculation of spillover spreading coefficients as described in Nguyen et al (2013). Quantifying spillover spreading for comparing instrument performance and aiding in multicolor panel design. *Cytometry Part A,* 83(3), 306-

315.; the disclosure of which is incorporated by reference herein. However, one limitation of conventional spillover spreading coefficients is that they require the identification of populations of flow cytometer data representing samples that are positive for a particular parameter (i.e., emit light from a fluorochrome of interest), and populations of flow cytometer data that are negative for the same parameter (i.e., do not emit light from the fluorochrome of interest). For example, FIG. 1B demonstrates the identification of positive 100*b* and negative 100*a* populations necessary for the calculation of spillover spreading coefficients according to Nguyen et al. (2013). Similarly, FIG. 2 depicts a conventional workflow for spillover compensation and spillover spreading characterization being performed in conjunction. After the identification of positive and negative populations of fluorescent flow cytometer data (step 101), calculation of the fluorescence spillover matrix (step 102), and spillover compensation (step 103), a spillover spreading matrix containing spillover spreading coefficients may be calculated (step 201). However, like the calculation of the fluorescence spillover matrix 102, calculation of the spillover spreading matrix 201 requires the identification of positive and negative populations, an often error-prone and time-consuming task for the user.

SUMMARY

Accordingly, the inventor has realized that an efficient solution for characterizing spillover spreading in flow cytometer data analysis is desired.

Aspects of the invention include methods for characterizing spillover spreading originating from a first fluorochrome in flow cytometer data obtained for a second fluorochrome. In some embodiments, methods include receiving flow cytometer data collected for each of a first fluorochrome and a second fluorochrome in order to assess the extent to which light emitting from the first fluorochrome precipitates error in the fluorescent flow cytometer data collected for the second fluorochrome. After it is received, embodiments of the method further include partitioning the fluorescent flow cytometer data into a number of quantiles according to the intensity of the data relative to the first fluorochrome. Embodiments of the method further include estimating a zero-adjusted standard deviation for the intensity of light collected from the second fluorochrome for each of the partitioned quantiles based on the assumption that the intensity of light collected from the first fluorochrome is zero. In embodiments, estimating a zero-adjusted standard deviation includes calculating a standard deviation of the intensity of light emitting from the second fluorochrome based on the assumption that the intensity of light collected from the first fluorochrome is zero ($\sigma_0$), and adjusting the standard deviation of the observed light emitting from the second fluorochrome ($\sigma$) based on $\sigma_0$. In embodiments, estimating a zero-adjusted standard deviation involves computing a first linear regression that includes the calculation of a linear fit between the square root of the median intensity of light collected from the first fluorochrome and the standard deviation of the intensity of light collected from the second fluorochrome. In embodiments, $\sigma_0$ is taken from the y-intercept of the linear fit calculated in the first linear regression. Embodiments of the method further include obtaining with a second linear regression a spillover spreading coefficient from the zero-adjusted standard deviations. In some embodiments, computing the second linear regression involves calculating for each partitioned quantile a linear fit between the zero-adjusted standard deviations and the median intensity of light collected from the first fluorochrome. In certain embodiments, the spillover spreading coefficient is taken from the slope of the linear fit calculated between the zero-adjusted standard deviation and the median intensity of light collected from the first fluorochrome. In embodiments, spillover spreading coefficients obtained in this manner are calculated for each combination of first and second fluorochromes, i.e., such that spillover originating from each fluorochrome is characterized for every other fluorochrome, and assembled in a spillover spreading matrix. Embodiments of the method may further include adjusting the fluorescent flow cytometer data based on the spillover spreading matrix.

Aspects of the invention further involve a system including a particle analyzer component configured to obtain fluorescent flow cytometer data, and a processor comprising memory operably coupled to the processor wherein the memory comprises instructions stored thereon, which when executed by the processor, cause the processor to characterize spillover spreading originating from a first fluorochrome in flow cytometer data obtained for a second fluorochrome. In some embodiments, the processor is configured to receive fluorescent flow cytometer data collected for each of a first fluorochrome and a second fluorochrome in order to assess the extent to which light emitting from the first fluorochrome precipitates error in the fluorescent flow cytometer data collected for the second fluorochrome. After data is received, the processor may be configured to partition the fluorescent flow cytometer data into a number of quantiles according to the intensity of the data relative to the first fluorochrome. In embodiments, the processor is further configured to estimate a zero-adjusted standard deviation for the intensity of light collected from the second fluorochrome for each of the partitioned quantiles based on the assumption that the intensity of light collected from the first fluorochrome is zero. In embodiments, estimating a zero-adjusted standard deviation includes calculating a standard deviation of the intensity of light emitting from the second fluorochrome based on the assumption that the intensity of light collected from the first fluorochrome is zero ($\sigma_0$), and adjusting the standard deviation of the observed light emitting from the second fluorochrome ($\sigma$) based on $\sigma_0$. In embodiments, estimating a zero-adjusted standard deviation involves computing a first linear regression that includes the calculation of a linear fit between the square root of the median intensity of light collected from the first fluorochrome and the standard deviation of the intensity of light collected from the second fluorochrome. In embodiments, $\sigma_0$ is taken from the y-intercept of the linear fit calculated in the first linear regression. The processor may be further configured to obtain with a second linear regression a spillover spreading coefficient from the zero-adjusted standard deviations. In some embodiments, computing the second linear regression involves calculating for each partitioned quantile a linear fit between the zero-adjusted standard deviations and the median intensity of light collected from the first fluorochrome. In certain embodiments, the spillover spreading coefficient is taken from the slope of the linear fit calculated between the zero-adjusted standard deviation and the median intensity of light collected from the first fluorochrome. In embodiments, spillover spreading coefficients obtained in this manner are calculated for each combination of first and second fluorochromes, i.e., such that spillover originating from each fluorochrome is characterized for every other fluorochrome, and assembled in a spillover spreading matrix. The processor may be further configured to adjust the fluorescent flow cytometer data based on the spillover spreading matrix.

Aspects of the present disclosure further include non-transitory computer readable storage media having instructions for practicing the subject methods. In some embodiments, the non-transitory storage medium includes instructions for receiving fluorescent flow cytometer data containing intensity signals collected from at least a first and second fluorochrome, partitioning the fluorescent flow cytometer data according to the intensity of the fluorescent flow cytometer data relative to the first fluorochrome, estimating with a first linear regression a zero-adjusted standard deviation for the intensity of light collected from the second fluorochrome for each of the partitioned quantiles based on the assumption that the intensity of light collected from the first fluorochrome is zero, obtaining with a second linear regression a spillover spreading coefficient from the zero-adjusted standard deviations to characterize spillover spreading originating from the first fluorochrome in flow cytometer data obtained for the second fluorochrome, assembling spillover spreading coefficients calculated for each pair of first and second fluorochromes in a spillover spreading matrix, and adjusting the fluorescent flow cytometer data based on the spillover spreading matrix.

BRIEF DESCRIPTION OF THE FIGURES

The invention may be best understood from the following detailed description when read in conjunction with the accompanying drawings. Included in the drawings are the following figures:

FIG. 5A depicts a spillover spreading matrix calculated according to an embodiment of the instant method.

FIG. 5B depicts a spillover spreading matrix calculated according to the conventional process.

FIG. 13 depicts the level of agreement between a spillover spreading matrix calculated according to the instant method and a conventional spillover spreading matrix.

FIG. 14 depicts the effects of performing the first linear regression on the fluorescent flow cytometer data.

DETAILED DESCRIPTION

Figure 1B:
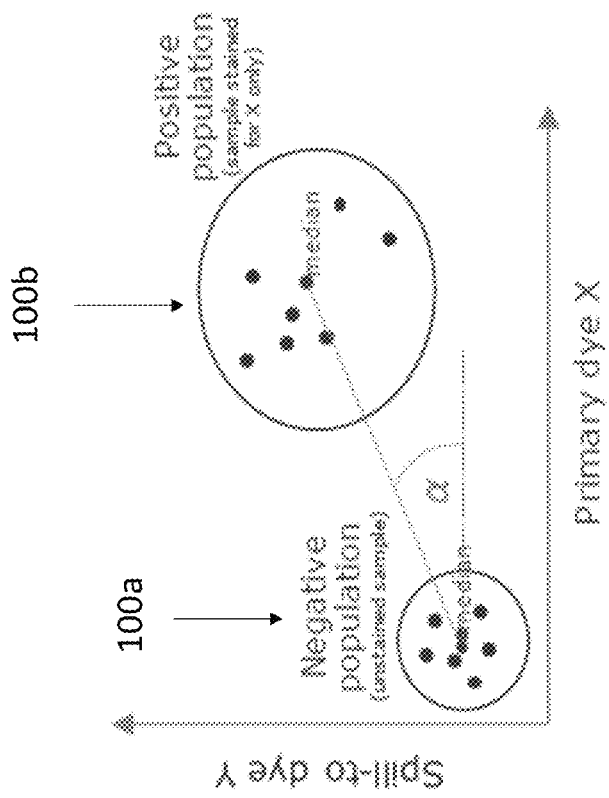
FIG. 1B depicts a graphical representation of the identification of positive and negative populations of fluorescent flow cytometer data according to conventional processes for spillover compensation and spillover spreading matrix calculation.

Methods for characterizing spillover spreading originating from a first fluorochrome in fluorescent flow cytometer data collected for a second fluorochrome are provided. In some embodiments, methods include partitioning the fluorescent flow cytometer data according to the intensity of the data relative to the first fluorochrome. In embodiments, methods also include estimating with a first linear regression a zero-adjusted standard deviation for the intensity of light collected from the second fluorochrome for each of the partitioned quantiles based on the assumption that the intensity of light collected from the first fluorochrome is zero, and obtaining with a second linear regression a spillover spreading coefficient from the zero-adjusted standard deviations. Systems and computer-readable media for characterizing spillover spreading originating from a first fluorochrome in fluorescent flow cytometer data collected for a second fluorochrome are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Characterizing Spillover Spreading in Fluorescent Flow Cytometer Data As discussed above, aspects of the present disclosure include methods for characterizing spillover spreading originating from a first fluorochrome in flow cytometer data obtained for a second fluorochrome. In embodiments, methods include receiving fluorescent flow cytometer data. By "fluorescent flow cytometer data" it is meant information regarding parameters of a sample (e.g., cells, particles) in a flow cell that is collected by any number of fluorescent light detectors in a particle analyzer. In embodiments, fluorescent flow cytometer data includes signals from a plurality of different fluorochromes, such as, for instance, ranging from 2 to 40 different fluorochromes, including 3 to 30 different fluorochromes, such as 3 to 20 different fluorochromes, and in some instances including 3 to 5 different fluorochromes. In some embodiments, a plurality of different fluorochromes includes 2 or more different fluorochromes, including 3 or more, 4 or more, 5 or more, 6 or more, 7 or more, 8 or more, 9 or more, 10 or more, 11, or more, 12 or more, 13 or more, 14 or more 15 or more, 20 or more, 25 or more and 30 or more different fluorochromes. Fluorescent flow cytometer data may be obtained by any convenient protocol, including those described below.

In some embodiments, methods include generating one or more population clusters based on the determined parameters (e.g., fluorescence) of analytes (e.g., cells, particles) in the sample. As used herein, a "population", or "subpopulation" of analytes, such as cells or other particles, generally refers to a group of analytes that possess properties (for example, optical, impedance, or temporal properties) with respect to one or more measured fluorescent parameters such that measured parameter data form a cluster in the data space. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured fluorescent parameters (i.e., fluorochromes), which corresponds to populations that differ in only a subset of the measured parameters or features extracted from the measurements of the sample.

In some embodiments, fluorescent flow cytometer data includes intensity signals originating from a first fluorochrome in flow cytometer data obtained for a second fluorochrome. In other words, light emitted from a first fluorochrome is collected by a detector configured to collect light emitted from a second fluorochrome. As described in the Introduction section, fluorescent flow cytometer data at the point of collection (i.e., the point at which it is received by one or more fluorescent light detectors) is subject to spillover spreading. Spillover is a phenomenon in which particle-modulated light indicative of a particular fluorochrome is received by one or more detectors that are not configured to measure that parameter. As such, light may "spillover" and be detected by off-target detectors. Spillover spreading, therefore, is noise present in the fluorescent flow cytometer data caused by spillover. As such, in some embodiments, unadjusted flow cytometer data is erroneous due to the unintentional detection of certain wavelengths of light by one or more detectors. In this case, the light emitted from the first fluorochrome adds signal to the detector configured to detect light from the second fluorochrome, i.e., the first fluorochrome causes spillover. The resultant flow cytometer data collected by the detector is therefore subject to spillover spreading due to the presence of light emitted from the first fluorochrome.

After flow cytometer data is received, embodiments of the invention include partitioning the flow cytometer data. "Partitioning" as described herein refers to distributing data into multiple, distinct, groups. In some instances, partitioning fluorescent flow cytometer data includes distributing flow cytometer data into quantiles. "Quantiles" are referred to in their conventional sense to describe each of a set of values dividing a frequency distribution into equal groups, each containing the same fraction of the total population. Therefore, in embodiments, each quantile contains the same fraction of fluorescent flow cytometer data points as each other fraction. In certain embodiments, fluorescent flow cytometer data is partitioned according to the intensity of the fluorescent flow cytometer data relative to the first fluorochrome. In other words, the intensity of light emitted from the first fluorochrome associated with an individual fluorescent flow cytometer data point determines the quantile into which that data point is partitioned. In embodiments, partitioning the fluorescent flow cytometer data according to the intensity of the data relative to the first fluorochrome includes distributing data points associated with similar intensities of light received for the first fluorochrome in the same quantiles.

Fluorescent flow cytometer data may be distributed into any convenient number of distinct quantiles. In some embodiments, the number of quantiles into which fluorescent flow cytometer data is distributed may be scaled to the size of the fluorescent flow cytometer data, i.e., how many data points are present. In some embodiments, larger flow cytometer data sets are partitioned into more distinct quantiles, while smaller flow cytometer data sets are partitioned into fewer distinct quantiles. In other embodiments, fluorescent flow cytometer data is generally partitioned into a default number of quantiles. In such embodiments, the default number of quantiles may be altered to suit different sizes of flow cytometer data sets. Altering the default number of quantiles may involve reducing the number of quantiles into which flow cytometer data is distributed to ensure that each quantile possesses a sufficient number of data points for the estimation of standard deviations of the data points within each quantile. In certain embodiments, the default number of quantiles is 256. In some embodiments, when presented with a smaller flow cytometer data set, the number of quantiles may be reduced to as low as 8 quantiles. As such, in some embodiments, the number of quantiles ranges from 8 to 256.

After fluorescent flow cytometer data has been partitioned, embodiments of the invention include estimating a zero-adjusted standard deviation for the intensity of light collected from the second fluorochrome for each of the partitioned quantiles. By "zero-adjusted" it is meant a standard deviation calculated for the flow cytometer data points contained within a quantile that has been adjusted to reflect the assumption that the intensity of light collected from the first fluorochrome is zero. In order to estimate the zero-adjusted standard deviations, embodiments of the invention include calculating for each quantile the median value of the intensity of light emitted from the first fluorochrome. Embodiments of the invention further include calculating the standard deviation of the intensity of light emitted from the second fluorochrome ($\sigma$). In some embodiments, the standard deviation of the intensity of light emitted from the second fluorochrome is a robust standard deviation, i.e., the standard deviation is resistant to outlier effects. In certain embodiments, the median value of the intensity of light emitted from the first fluorochrome and the standard deviation of light emitted from the second fluorochrome are subsequently employed to estimate of the standard deviation of the intensity of light collected from the second fluorochrome based on the assumption that the intensity of light collected from the first fluorochrome is zero ($\sigma_0$).

In embodiments, estimating $\sigma_0$ includes performing a first linear regression. In embodiments, performing a first linear regression includes calculating a linear fit between the square root of the median value of the intensity of light emitted from the first fluorochrome and the standard deviation of the intensity of light emitted from the second fluorochrome ($\sigma$). In embodiments, the square root of the median value of the intensity of light emitted from the first fluorochrome is plotted along the x-axis, and the standard deviation of the intensity of light emitted from the second fluorochrome is plotted along the y-axis. In some embodiments, the first linear regression is performed with an ordinary least squares regression model. Ordinary least squares regression models are described in, for example, Hutcheson, G. D. (1999). Ordinary least-squares regression. In Hutcheson, G. D. *The multivariate social scientist* (pp. 56-113); herein incorporated by reference. In other embodiments, the first linear regression is performed with a weighted least squares model. Weighted least squares models are discussed in, for example, Strutz, T. (2015). *Data Fitting and Uncertainty: A practical introduction to weighted least squares and beyond*; herein incorporated by reference. In still other embodiments, the first linear regression is performed by a robust linear model. Robust linear models are described in, for example, Andersen, R. (2008). *Modern methods for robust regression*; herein incorporated by reference.

Figure 3:
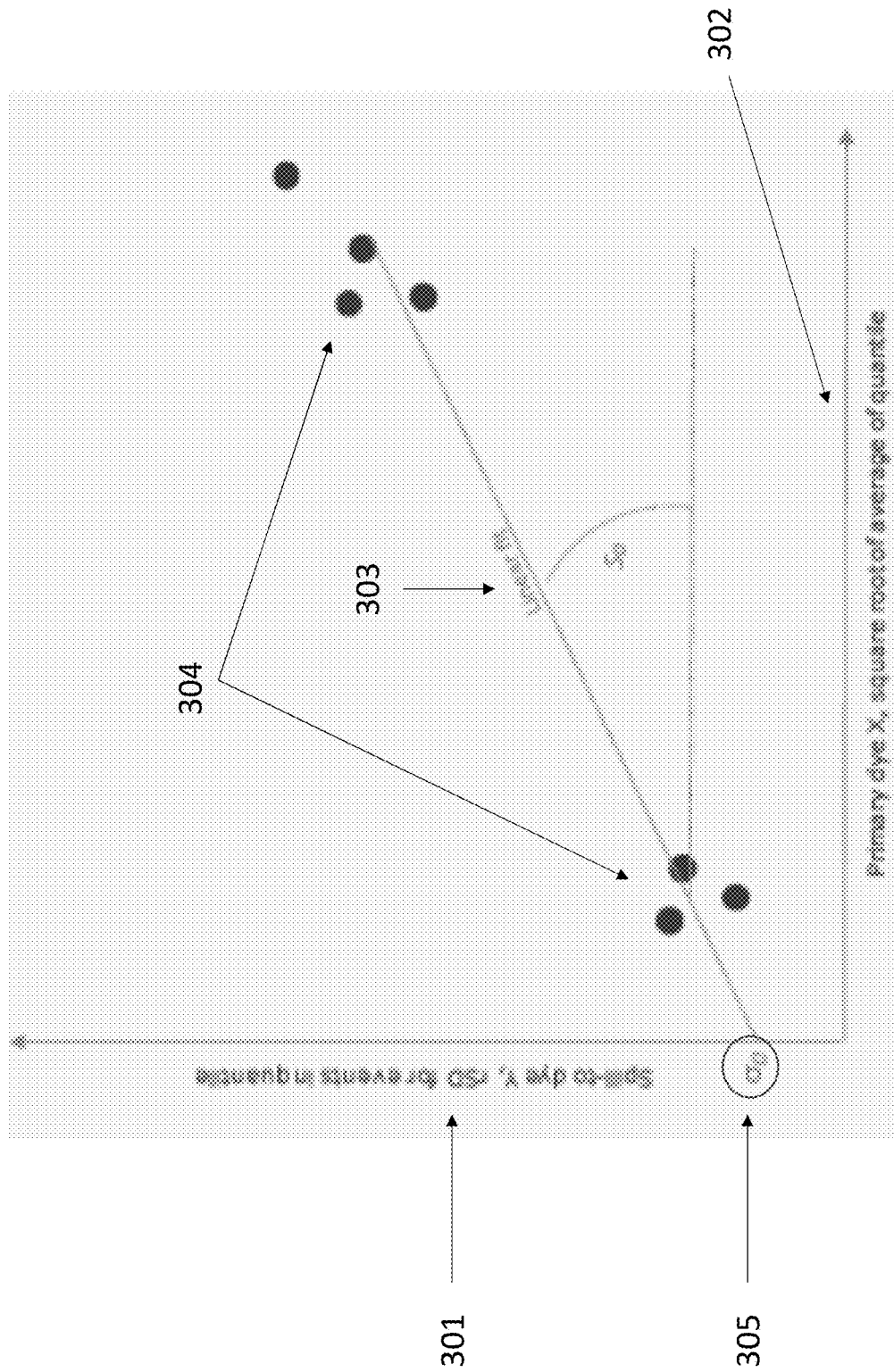
FIG. 3 depicts a graphical representation of the first linear regression.

After the linear fit is calculated, embodiments of the invention include calculating $\sigma_0$ based on the assumption that the intensity of light collected from the first fluorochrome is zero by determining the y-intercept of the linear fit. In other words, the standard deviation of the intensity of light emitted from the second fluorochrome when the median fluorescence of light emitted from the first fluorochrome is zero (i.e., when the line intercepts the y-axis) is taken as $\sigma_0$. For example, FIG. 3 depicts the first linear regression. The square root of the median value of the intensity of light emitted from the first fluorochrome is plotted along the x-axis 302, and the standard deviation of the intensity of light emitted from the second fluorochrome is plotted along the y-axis 301. A linear fit 303 is calculated for the flow cytometer data points 304. The value 305 at which linear fit 303 intercepts the y-axis 301 is taken as an estimate of the standard deviation of the intensity of light collected from the second fluorochrome based on the assumption that the intensity of light collected from the first fluorochrome is zero ($\sigma_0$). After $\sigma_0$ is estimated by the first linear regression, embodiments of the invention further include computing the zero-adjusted standard deviation based on the estimated value for $\sigma_0$. In such embodiments, the zero-adjusted standard deviation is determined by the square root of the difference between $\sigma^2$ and $\sigma_0^2$, i.e., $\sqrt{\sigma^2 - \sigma_0^2}$.

Aspects of the invention further include obtaining a spillover spreading coefficient. In certain embodiments, obtaining a spillover spreading coefficient includes quantifying the extent to which fluorescent flow cytometer data collected for a second fluorochrome by a detector is impacted by the simultaneous collection of light from a first fluorochrome by the same detector. In some instances, fluorescent flow cytometer data subject to spillover spreading is impacted by signal intensities that are higher than would otherwise be observed (i.e., the spillover spreading noise is constructive). In other instances, fluorescent flow cytometer data subject to spillover spreading is impacted by signal intensities that are lower than otherwise would be observed (i.e., the spillover spreading noise is destructive). In embodiments, obtaining a spillover spreading coefficient involves performing a second linear regression. In such embodiments, performing second linear regression includes calculating for each partitioned quantile a linear fit between the zero-adjusted standard deviation and the median intensity of light collected from the first fluorochrome. In embodiments, the zero-adjusted standard deviation is plotted along the y-axis and the median intensity of light collected from the first fluorochrome is plotted along the x-axis. The spillover spreading coefficient is subsequently obtained from the slope of the linear fit calculated between the zero-adjusted standard deviation and the median intensity of light collected from the first fluorochrome. In some embodiments, the second linear regression is performed with an ordinary least squares regression model. In other embodiments, the second linear regression is performed with a weighted least squares model. In still other embodiments, the second linear regression is performed by a robust linear model. In certain embodiments, both the first and second linear regressions are performed by a weighted least squares model. In other embodiments, both the first and second linear regressions are performed by a robust linear model.

Figure 4:
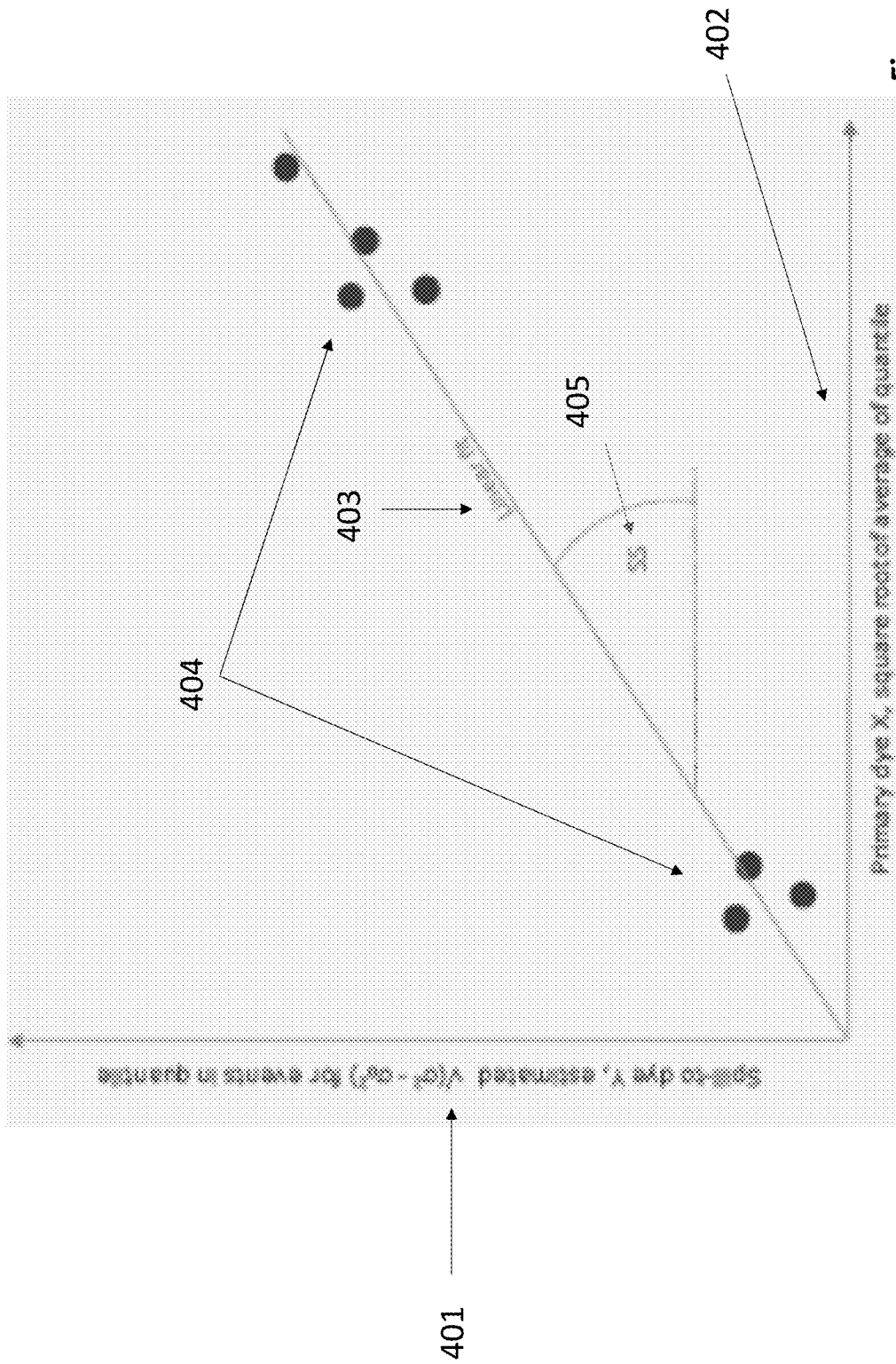
FIG. 4 depicts a graphical representation of the second linear regression.

For example, FIG. 4 depicts a graphical representation of the second linear regression. The zero-adjusted standard deviation is plotted along the y-axis 401 and the median intensity of light collected from the first fluorochrome is plotted along the x-axis 402. A linear fit 403 is calculated based on fluorescent flow cytometer data 404. The spillover spreading coefficient is obtained from the slope 405 of the linear fit 403.

Consequently, in embodiments, the spillover spreading coefficient as described herein can be computed according to Equation 1:

$$SS = \frac{\sqrt{\sigma^2 - \sigma_0^2}}{\sqrt{F}}$$

As shown in Equation 1, SS is the spillover spreading coefficient; $\sigma$ is the standard deviation of light collected from the second fluorochrome; $\sigma_0$ is the estimate of the standard deviation of the intensity of light collected from the second fluorochrome based on the assumption that the intensity of light collected from the first fluorochrome is zero; and F is the median intensity of light collected from the first fluorochrome. As such, the spillover spreading coefficient measures the extent to which fluorescent flow cytometer data collected by a given fluorescent light detector is impacted by the presence of light associated with a particular fluorochrome. In other words, the spillover spreading coefficient estimates the error (i.e., noise) contributed to the fluorescent flow cytometer data by light emitting from the relevant fluorochrome being collected by a given detector. In embodiments, a higher spillover spreading coefficient corresponds to more spillover spreading for a given pair of first and second fluorochromes. In embodiments, the spillover spreading coefficient is obtained without the identification of populations of fluorescent flow cytometer data that are positive (i.e., do exhibit the relevant parameter) and negative (i.e., do not exhibit the relevant parameter) with respect to a particular fluorochrome.

In some embodiments, the first and second linear regressions are combined in a combined linear regression. In such embodiments, the combined linear regression is configured to calculate the standard deviation of the intensity of light collected from the second fluorochrome based on the assumption that the intensity of light collected from the first fluorochrome is zero ($\sigma_0$) and obtain the spillover spreading coefficient simultaneously. In embodiments, the combined linear regression is configured to calculate a linear fit between the square of the standard deviation of the intensity of light collected from the second fluorochrome and the median intensity of light collected from the first fluorochrome. In some embodiments, the combined linear regression is performed by a weighted least squares model. In other embodiments, the combined linear regression is performed by a robust linear model.

Figure 5A:
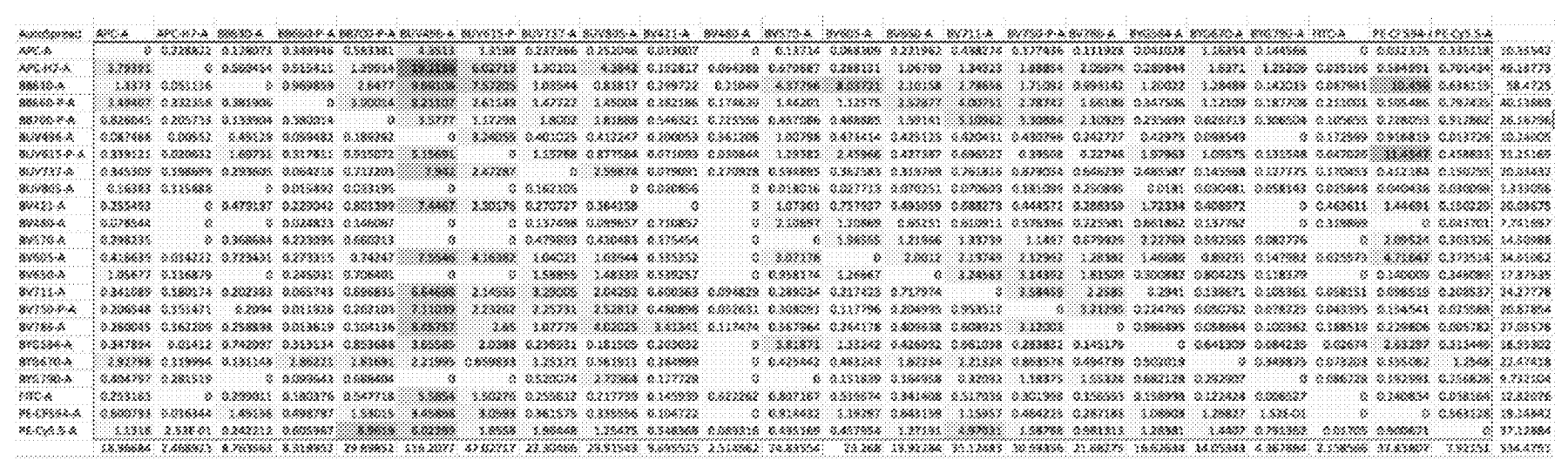

Embodiments of the invention also include calculating spillover spreading coefficients for each possible combination of first and second fluorochromes so that it can be determined how fluorescent flow cytometer data collected at each detector is affected by the presence of light associated with each fluorochrome. Put another way, aspects of the invention include calculating multiple spillover spreading coefficients (e.g., as described above) such that a spillover spreading coefficient is provided for each possible pair of first and second fluorochromes. In embodiments, spillover spreading coefficients calculated for each pair of first and second fluorochromes are combined in a spillover spreading matrix. In certain embodiments, the spillover spreading matrix demonstrates how the detection of a particular fluorochrome by its corresponding detector is impacted by spillover from other fluorochromes. In embodiments, the spillover spreading matrix containing spillover spreading coefficients as described herein characterizes the spillover spreading effects originating from each fluorochrome in fluorescent flow cytometer data collected for each other fluorochrome without the identification of populations of fluorescent flow cytometer data that are positive or negative with respect to said fluorochromes. For example, FIG. 5A presents one embodiment of a spillover spreading matrix that provides spillover spreading coefficients (e.g., obtained as described above) for 23 different fluorochromes. Each column in the matrix corresponds to a detector configured to detect one of the 23 different fluorochromes, and each row in the matrix corresponds to a parameter of flow cytometer data that is detected. The cell in which a column and row intersects is populated with a spillover spreading coefficient calculated for that pair of first and second fluorochromes indicating the extent to which the fluorochrome in question (i.e., the first fluorochrome) contributes error to the relevant detector (i.e., detection of light emitted from the second fluorochrome). The total degree to which a fluorochrome causes spillover spreading can be approximated by summing all the values in its row, and the total degree to which a detector is impacted by spillover spreading can be calculated by summing all the values in its column. In some embodiments, spillover spreading coefficients are summed in order to calculate the total spreading effect (i.e., the cumulative effect of spillover spreading on a particular subset of fluorescent flow cytometer data).

Figure 5B:
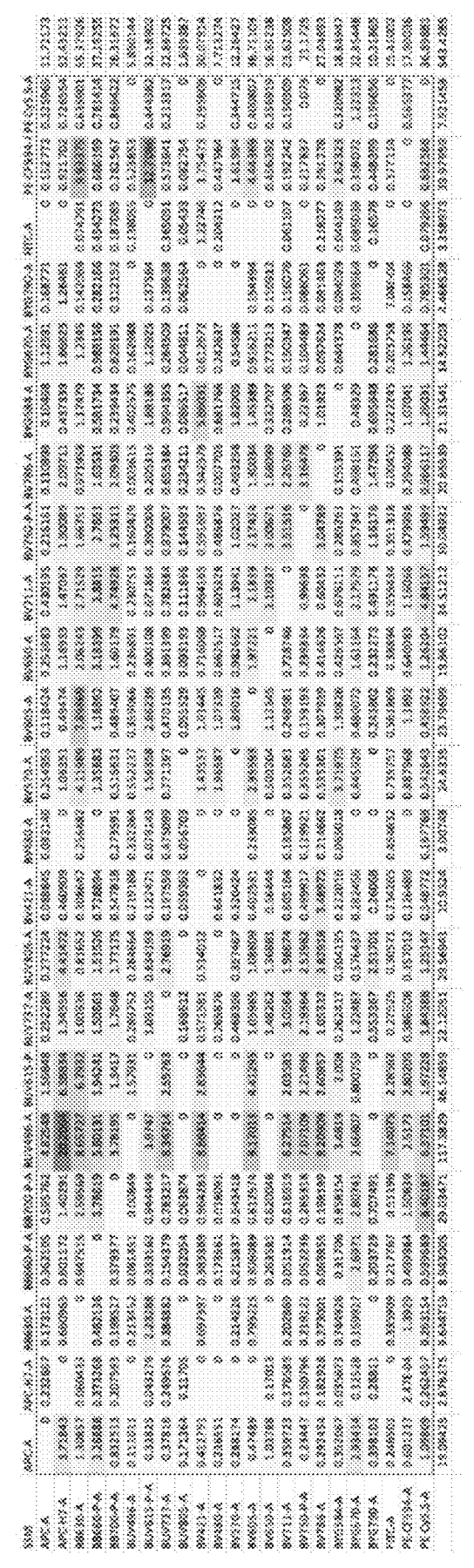

As discussed above, in embodiments, the spillover spreading matrix as described herein is populated with spillover spreading coefficients computed without the identification of positive and negative populations of fluorescent flow cytometer data with respect to each relevant fluorochrome. However, in some embodiments, the spillover spreading matrix as described herein is populated with spillover spreading coefficients that approximate spillover spreading coefficients that have been calculated with the identification of positive and negative populations of fluorescent flow cytometer data with respect to each relevant fluorochrome, i.e., they approximate spillover spreading coefficients calculated as taught by Nguyen et al. (2013). For example, FIG. 5B depicts a conventional spillover spreading matrix (i.e., one requiring the identification of positive and negative populations of fluorescent flow cytometer data with respect to each relevant fluorochrome) that is calculated based on the same dataset used for calculating the spillover spreading matrix shown in FIG. 5A. When the spillover spreading matrix calculated as described herein (shown in FIG. 5A) is compared to the conventionally calculated spillover spreading matrix (shown in FIG. 5B), a high level of agreement between the two matrices regarding the magnitude of spillover spreading for each fluorochrome-fluorochrome pair is observed.

Aspects of the present disclosure further include adjusting fluorescent flow cytometer data to account for spillover spreading. By "adjusting" it is meant altering the data such that it more accurately quantifies the presence of fluorochromes in the sample (e.g., cells, particles) being irradiated in the flow cell. In some embodiments, fluorescent flow cytometer data is adjusted such that it no longer includes error resulting from spillover spreading. In embodiments, adjusting fluorescent flow cytometer data includes generating spillover spreading adjusted populations. In certain embodiments, generating spillover spreading adjusted populations includes subtracting the magnitude of the spillover spreading from the relevant population(s) of flow cytometer data, i.e., to counteract the effects of signals being impacted by spillover spreading. In certain embodiments, the magnitude of spillover spreading is determined from the spillover spreading matrix. In some embodiments, adjusting flow cytometer data includes subtracting the total spreading effect from the relevant portion of the flow cytometer data.

Figure 6:
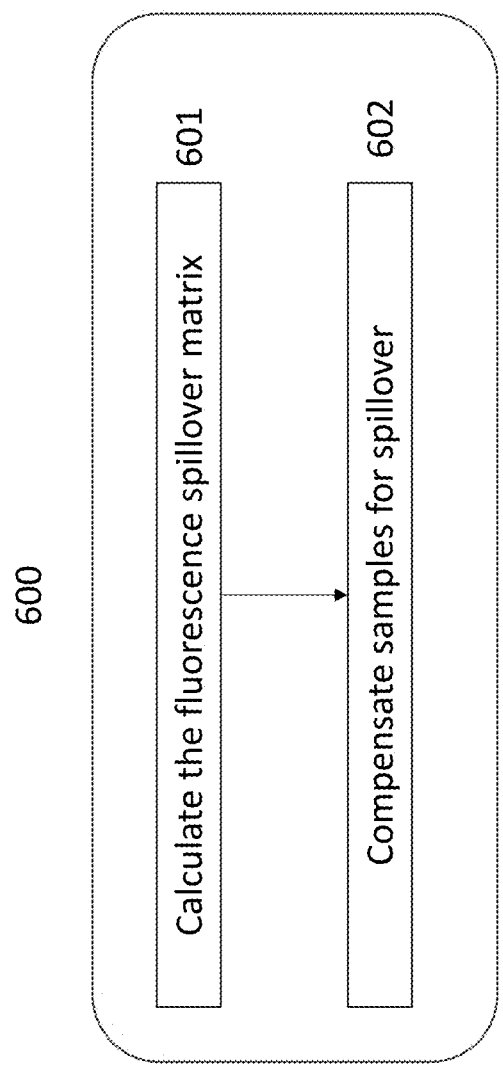
FIG. 6 depicts a flowchart demonstrating the process of spillover compensation according to the AutoSpill algorithm.

Some embodiments of the invention further include compensating fluorescent flow cytometer data for spillover. As discussed above in the Introduction section, spillover is a phenomenon in which particle-modulated light indicative of a particular fluorochrome is received by one or more detectors that are not configured to measure that parameter. Compensation, therefore, mathematically removes this overlap from the fluorescent flow cytometer data. Any convenient method may be used to compensate fluorescent flow cytometer data for spillover. In some embodiments, unmixing may be performed. Unmixing employs single-stained reference controls for separating fluorescent populations and identifying spectra associated with each fluorochrome. In other embodiments, spillover compensation is performed by the AutoSpill algorithm. AutoSpill is an algorithm developed by developed by FlowJo LLC (a subsidiary of Becton Dickinson) for calculating spillover and producing a fluorescence spillover matrix composed of spillover coefficients mathematically characterizing the extent to which light emitting from one fluorochrome adds signal to flow cytometer data collected for another fluorochrome. AutoSpill is described in Roca et al. (2020). AutoSpill: a method for calculating spillover coefficients in high-parameter flow cytometry. *bioRxiv*; herein incorporated by reference. AutoSpill combines automated gating of cells, calculation of an initial spillover matrix based on robust linear regression, and iterative refinement to reduce error. AutoSpill determines spillover coefficients from the slope of a linear regression considering the fluorescence in a primary channel (the channel assigned to the dye in a single color control) as the dependent variable and the fluorescence in a secondary channel (i.e., light collected by another detector) as the independent variable. Absence of spillover corresponds to a zero slope in this regression. Furthermore, AutoSpill iteratively refines the spillover matrix and recalculates compensation, thereby reducing errors in the spillover matrix and errors in compensation to a negligible magnitude. For example, FIG. 6 depicts a sample workflow representing the AutoSpill algorithm 600. In step 601, a fluorescence spillover matrix is calculated by obtaining spillover coefficients with linear regression (e.g., as discussed above). In step 602, fluorescent flow cytometer data is compensated based on the fluorescence spillover matrix calculated in step 601.

Figure 1A:
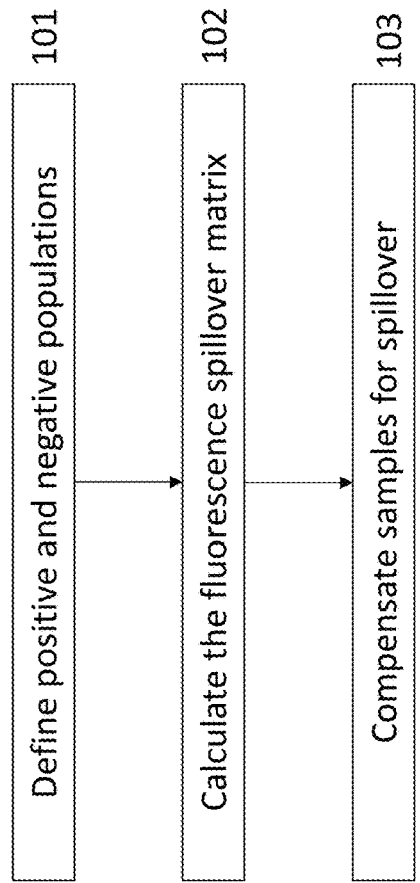
FIG. 1A depicts a flowchart demonstrating the conventional process for spillover compensation.
Figure 2:
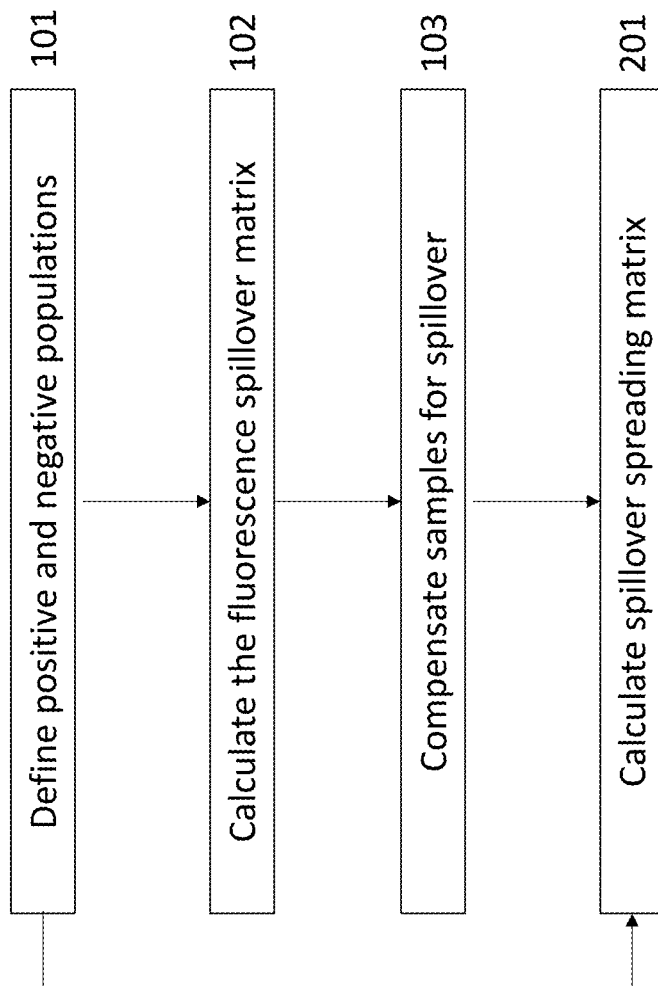
FIG. 2 depicts the conventional process for performing spillover compensation in conjunction with the calculation of a spillover spreading matrix.
Figure 7:
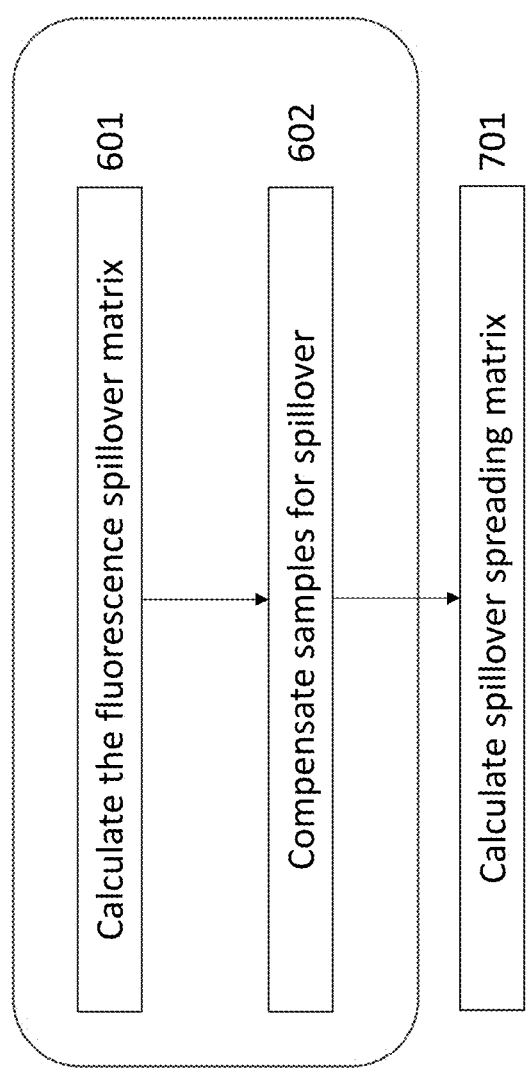
FIG. 7 depicts a flowchart demonstrating the process of performing an embodiment of the instant method in conjunction with the AutoSpill algorithm.

In some embodiments of the invention, a spillover spreading matrix composed of spillover spreading coefficients (obtained as discussed above) is calculated in conjunction with compensating the fluorescent flow cytometer data for spillover. This may be performed with or without the identification of positive and negative populations of fluorescent flow cytometer data with respect to each relevant fluorochrome. In some embodiments, calculation of a spillover spreading matrix in conjunction with spillover compensation is performed without identification of positive and negative populations. In such embodiments, the calculation of the spillover matrix and spillover compensation is performed by AutoSpill. For example, FIG. 7 depicts a workflow involving AutoSpill. Because AutoSpill performs a linear regression that obviates the need for the identification of positive and negative populations, step 101 (described above regarding FIGS. 1A-B and 2) is not necessary. As such, AutoSpill performs the calculation of the fluorescence spillover matrix (step 601), and the compensation of the fluorescent flow cytometer data based on the calculated fluorescence spillover matrix (step 602). After the samples are compensated, a spillover spreading matrix is calculated (step 701) using spillover spreading coefficients described herein. In some embodiments, fluorescent flow cytometer data may additionally be adjusted to account for the error present in the data caused by spillover, if desired.

Figure 8:
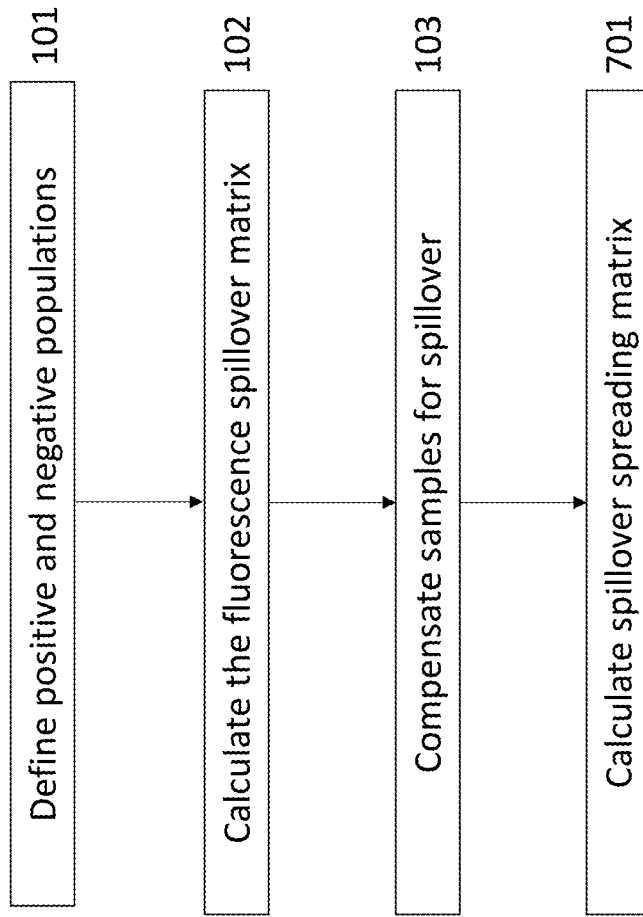
FIG. 8 depicts a flowchart demonstrating the process of performing an embodiment of the instant method in conjunction with a conventional spillover compensation algorithm.

In other embodiments, calculation of a spillover spreading matrix in conjunction with spillover compensation is performed with identification of positive and negative populations. In such embodiments, spillover compensation may be performed by an algorithm other than AutoSpill. In embodiments, compensation is performed via unmixing. For example, FIG. 8 depicts a workflow in which positive and negative populations of flow cytometer data (step 101) are identified. After the populations are identified, calculation of the fluorescence spillover matrix (step 102) and the compensation of the fluorescent flow cytometer data based on the fluorescence spillover matrix (step 103) may be carried out in the conventional manner. Following compensation, a spillover spreading matrix is calculated as described herein (step 701). In some embodiments, fluorescent flow cytometer data may additionally be adjusted to account for the error present in the data caused by spillover, if desired. While step 701 does not require the identification of positive and negative populations of flow cytometer data, such identification is performed for the sake of the spillover compensation.

As summarized above, the fluorescent flow cytometer data employed in methods of the invention may be obtained using any convenient protocol. In some embodiments, a sample having particles is irradiated with a light source and light from the sample is detected to generate populations of related particles based at least in part on the measurements of the detected light. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having particles (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods include irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

Aspects of the present invention include collecting fluorescent light with a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescent light detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescent light detectors. In embodiments, each of the fluorescent light detectors is configured to generate a fluorescence data signal. Fluorescence from the sample may be detected by each fluorescent light detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample. In embodiments, fluorescent flow cytometer data is received from one or more fluorescent light detectors (e.g., one or more detection channels), such as 2 or more, such as 3 or more, such as 4 or more, such as 5 or more, such as 6 or more and including 8 or more fluorescent light detectors (e.g., 8 or more detection channels).

Systems for Characterizing Spillover Spreading in Fluorescent Flow Cytometer Data Aspects of the present disclosure include systems for classifying fluorescent flow cytometer data. In embodiments, fluorescent flow cytometer data is clustered, adjusted for spillover spreading, and partitioned so that separate populations are classified differently. In some embodiments, systems include a particle analyzer configured to produce fluorescent flow cytometer data, and a processor configured to analyze the fluorescent flow cytometer data.

In some embodiments, the subject particle analyzers have a flow cell, and a laser configured to irradiate particles in the flow cell. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

Aspects of the invention also include a forward scatter detector configured to detect forward scattered light. The number of forward scatter detectors in the subject flow cytometers may vary, as desired. For example, the subject particle analyzers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple forward scatter detectors, each detector may be the same, or the collection of detectors may be a combination of different types of detectors. For example, where the subject particle analyzers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple side scatter detectors, each side scatter detector may be the same, or the collection of side scatter detectors may be a combination of different types of detectors. For example, where the subject particle analyzers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49 (pt 1):17-28; Linden, et. al., *Semin Throm Hemost.* 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852;

10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In certain embodiments, the subject systems additionally include a processor having memory operably coupled to the processor wherein the memory includes instructions stored thereon, which when executed by the processor, cause the processor to characterize spillover spreading originating from a first fluorochrome in flow cytometer data obtained for a second fluorochrome. In embodiments, the processor is configured to receive fluorescent flow cytometer data. In embodiments, fluorescent flow cytometer data includes signals from a plurality of different fluorochromes, such as, for instance, ranging from 2 to 20 different fluorochromes, and including 3 to 5 different fluorochromes. In some embodiments, a plurality of different fluorochromes includes 2 or more different fluorochromes, including 3 or more, 4 or more, 5 or more, 6 or more, 7 or more, 8 or more, 9 or more, 10 or more, 11, or more, 12 or more, 13 or more, 14 or more 15 or more, and 20 or more different fluorochromes. Fluorescent flow cytometer data may be obtained by any convenient protocol.

In some embodiments, fluorescent flow cytometer data includes intensity signals originating from a first fluorochrome in flow cytometer data obtained for a second fluorochrome. In other words, light emitting from a first fluorochrome is collected by a detector configured to collect light emitting from a second fluorochrome. As described in the Introduction section, fluorescent flow cytometer data at the point of collection (i.e., the point at which it is received by one or more fluorescent light detectors) is subject to spillover spreading. Spillover is a phenomenon in which particle-modulated light indicative of a particular fluorochrome is received by one or more detectors that are not configured to measure that parameter. As such, light may "spillover" and be detected by off-target detectors. Spillover spreading, therefore, is noise present in the fluorescent flow cytometer data caused by spillover. As such, in some embodiments, unadjusted flow cytometer data is erroneous due to the unintentional detection of certain wavelengths of light by one or more detectors. In this case, the light emitted from the first fluorochrome adds signal to the detector configured to detect light from the second fluorochrome, i.e., the first fluorochrome causes spillover. The resultant flow cytometer data collected by the detector is therefore subject to spillover spreading due to the presence of light emitted from the first fluorochrome.

After fluorescent flow cytometer data is received, the processor may be configured to partition the fluorescent flow cytometer data. In some instances, partitioning fluorescent flow cytometer data includes distributing flow cytometer data into quantiles. In embodiments, each quantile contains the same fraction of fluorescent flow cytometer data points as each other fraction. In certain embodiments, fluorescent flow cytometer data is partitioned according to the intensity of the fluorescent flow cytometer data relative to the first fluorochrome. In other words, the intensity of light emitted from the first fluorochrome associated with an individual fluorescent flow cytometer data point determines the quantile into which that data point is partitioned. In embodiments, partitioning the fluorescent flow cytometer data according to the intensity of the data relative to the first fluorochrome includes distributing data points associated with similar intensities of light received for the first fluorochrome in the same quantiles.

In embodiments, the processor is configured to distribute fluorescent flow cytometer data into any convenient number of distinct quantiles. In some embodiments, the number of quantiles into which fluorescent flow cytometer data is distributed may be scaled to the size of the fluorescent flow cytometer data, i.e., how many data points are present. In some embodiments, larger flow cytometer data sets are partitioned into more distinct quantiles, while smaller flow cytometer data sets are partitioned into fewer distinct quantiles. In other embodiments, fluorescent flow cytometer data is generally partitioned into a default number of quantiles. In such embodiments, the default number of quantiles may be altered to suit different sizes of flow cytometer data sets. Altering the default number of quantiles may involve reducing the number of quantiles into which flow cytometer data is distributed to ensure that each quantile possesses a sufficient number of data points for the estimation of standard deviations of the data points within each quantile. In certain embodiments, the default number of quantiles is 256. In some embodiments, when presented with a smaller flow cytometer data set, the number of quantiles may be reduced to as low as 8 quantiles. As such, in some embodiments, the number of quantiles ranges from 8 to 256.

After fluorescent flow cytometer data has been partitioned, the processor may be configured to estimate a zero-adjusted standard deviation for the intensity of light collected from the second fluorochrome for each of the partitioned quantiles. In order to estimate the zero-adjusted standard deviations, embodiments of the invention include calculating for each quantile the median value of the intensity of light emitted from the first fluorochrome. Embodiments of the invention further include calculating the standard deviation of the intensity of light emitted from the second fluorochrome ($\sigma$). In some embodiments, the standard deviation of the intensity of light emitted from the second fluorochrome is a robust standard deviation, i.e., the standard deviation is resistant to outlier effects. In certain embodiments, the median value of the intensity of light emitted from the first fluorochrome and the standard deviation of light emitted from the second fluorochrome are subsequently employed to estimate of the standard deviation of the intensity of light collected from the second fluorochrome based on the assumption that the intensity of light collected from the first fluorochrome is zero ($\sigma_0$).

In embodiments, estimating $\sigma_0$ includes performing a first linear regression. In embodiments, performing a first linear regression includes calculating a linear fit between the square root of the median value of the intensity of light emitted from the first fluorochrome and the standard deviation of the intensity of light emitted from the second fluorochrome ($\sigma$). In embodiments, the square root of the median value of the intensity of light emitted from the first fluorochrome is plotted along the x-axis, and the standard deviation of the intensity of light emitted from the second fluorochrome is plotted along the y-axis. In some embodiments, the first linear regression is performed with an ordinary least squares regression model. In other embodiments, the first linear regression is performed with a weighted least squares model. In still other embodiments, the first linear regression is performed by a robust linear model.

After the linear fit is calculated, the processor may be configured to calculate $\sigma_0$ based on the assumption that the intensity of light collected from the first fluorochrome is zero by determining the y-intercept of the linear fit. In other words, the standard deviation of the intensity of light emitted from the second fluorochrome when the median fluorescence of light emitted from the first fluorochrome is zero (i.e., when the line intercepts the y-axis) is taken as $\sigma_0$. After $\sigma_0$ is estimated by the first linear regression, embodiments of the invention further include computing the zero-adjusted standard deviation based on the estimated value for $\sigma_0$. In such embodiments, the zero-adjusted standard deviation is determined by the square root of the difference between $\sigma^2$ and $\sigma_0^2$, i.e., $\sqrt{\sigma^2-\sigma_0^2}$.

The processor may be further configured to obtain a spillover spreading coefficient. In certain embodiments, obtaining a spillover spreading coefficient includes quantifying the extent to which fluorescent flow cytometer data collected for a second fluorochrome by a detector is impacted by the simultaneous collection of light from a first fluorochrome by the same detector. In some instances, fluorescent flow cytometer data subject to spillover spreading is impacted by signal intensities that are higher than would otherwise be observed (i.e., the spillover spreading noise is constructive). In other instances, fluorescent flow cytometer data subject to spillover spreading is impacted by signal intensities that are lower than otherwise would be observed (i.e., the spillover spreading noise is destructive). In embodiments, obtaining a spillover spreading coefficient involves performing a second linear regression. In such embodiments, performing second linear regression includes calculating for each partitioned quantile a linear fit between the zero-adjusted standard deviation and the median intensity of light collected from the first fluorochrome. In embodiments, the zero-adjusted standard deviation is plotted along the y-axis (i.e., dependent variable) and the median intensity of light collected from the first fluorochrome is plotted along the x-axis (i.e., independent variable). The spillover spreading coefficient is subsequently obtained from the slope of the linear fit calculated between the zero-adjusted standard deviation and the median intensity of light collected from the first fluorochrome. In some embodiments, the second linear regression is performed with an ordinary least squares regression model. In other embodiments, the second linear regression is performed with a weighted least squares model. In still other embodiments, the second linear regression is performed by a robust linear model. In certain embodiments, both the first and second linear regressions are performed by a weighted least squares model. In other embodiments, both the first and second linear regressions are performed by a robust linear model.

Consequently, in embodiments, the spillover spreading coefficient as described herein can be computed according to Equation 1:

$$SS = \frac{\sqrt{\sigma^2 - \sigma_0^2}}{\sqrt{F}}$$

As shown in Equation 1, SS is the spillover spreading coefficient; $\sigma$ is the standard deviation of light collected from the second fluorochrome; $\sigma_0$ is the estimate of the standard deviation of the intensity of light collected from the second fluorochrome based on the assumption that the intensity of light collected from the first fluorochrome is zero; and F is the median intensity of light collected from the first fluorochrome. As such, the spillover spreading coefficient measures the extent to which fluorescent flow cytometer data collected by a given fluorescent light detector is impacted by the presence of light associated with a particular fluorochrome. In other words, the spillover spreading coefficient estimates the error (i.e., noise) contributed to the fluorescent flow cytometer data by light emitting from the relevant fluorochrome being collected by a given detector. In embodiments, a higher spillover spreading coefficient corresponds to more spillover spreading for a given pair of first and second fluorochromes. In embodiments, the spillover spreading coefficient is obtained without the identification of populations of fluorescent flow cytometer data that are positive (i.e., do exhibit the relevant parameter) and negative (i.e., do not exhibit the relevant parameter) with respect to a particular fluorochrome.

In some embodiments, the first and second linear regressions are combined in a combined linear regression. In such embodiments, the combined linear regression is configured to calculate the standard deviation of the intensity of light collected from the second fluorochrome based on the assumption that the intensity of light collected from the first fluorochrome is zero ($\sigma_0$) and obtain the spillover spreading coefficient simultaneously. In embodiments, the combined linear regression is configured to calculate a linear fit between the square of the standard deviation of the intensity of light collected from the second fluorochrome and the median intensity of light collected from the first fluorochrome. In some embodiments, the combined linear regression is performed by a weighted least squares model. In other embodiments, the combined linear regression is performed by a robust linear model.

The processor may also be configured to calculate spillover spreading coefficients for each possible combination of first and second fluorochromes so that it can be determined how fluorescent flow cytometer data collected at each detector is affected by the presence of light associated with each fluorochrome. Put another way, aspects of the invention include calculating multiple spillover spreading coefficients (e.g., as described above) such that a spillover spreading coefficient is provided for each possible pair of first and second fluorochromes. In embodiments, spillover spreading coefficients calculated for each pair of first and second fluorochromes are combined in a spillover spreading matrix. In certain embodiments, the spillover spreading matrix demonstrates how the detection of a particular fluorochrome by its corresponding detector is impacted by spillover from other fluorochromes. In embodiments, the spillover spreading matrix containing spillover spreading coefficients as described herein characterizes the spillover spreading effects originating from each fluorochrome in fluorescent flow cytometer data collected for each other fluorochrome without the identification of populations of fluorescent flow cytometer data that are positive or negative with respect to said fluorochromes. Each column in the matrix corresponds to a detector configured to detect one of the different fluorochromes, and each row in the matrix corresponds to a parameter of flow cytometer data that is detected. The cell in which a column and row intersects is populated with a spillover spreading coefficient calculated for that pair of first and second fluorochromes indicating the extent to which the fluorochrome in question (i.e., the first fluorochrome) contributes error to the relevant detector (i.e., detection of light emitted from the second fluorochrome). The total degree to which a fluorochrome causes spillover spreading can be approximated by summing all the values in its row, and the total degree to which a detector is impacted by spillover spreading can be calculated by summing all the values in its column. In some embodiments, spillover spreading coefficients are summed in order to calculate the total spreading effect (i.e., the cumulative effect of spillover spreading on a particular subset of fluorescent flow cytometer data).

As discussed above, in embodiments, the spillover spreading matrix as described herein is populated with spillover spreading coefficients computed without the identification of positive and negative populations of fluorescent flow cytometer data with respect to each relevant fluorochrome. However, in some embodiments, the spillover spreading matrix as described herein is populated with spillover spreading coefficients that approximate spillover spreading coefficients that have been calculated with the identification of positive and negative populations of fluorescent flow cytometer data with respect to each relevant fluorochrome, i.e., they approximate spillover spreading coefficients calculated as taught by Nguyen et al. (2013).

The processor may be further configured to adjust fluorescent flow cytometer data to account for spillover spreading. In some embodiments, fluorescent flow cytometer data is adjusted such that it no longer includes error resulting from spillover spreading. In embodiments, adjusting fluorescent flow cytometer data includes generating spillover spreading adjusted populations. In certain embodiments, generating spillover spreading adjusted populations includes subtracting the magnitude of the spillover spreading from the relevant population(s) of flow cytometer data, i.e., to counteract the effects of signals being impacted by spillover spreading. In certain embodiments, the magnitude of spillover spreading is determined from the spillover spreading matrix. In some embodiments, adjusting flow cytometer data includes subtracting the total spreading effect from the relevant portion of the flow cytometer data.

In some embodiments, the processor is configured to compensate fluorescent flow cytometer data for spillover. Any convenient method may be used to compensate fluorescent flow cytometer data for spillover. In some embodiments, unmixing may be performed. Unmixing employs single-stained reference controls for separating fluorescent populations and identifying spectra associated with each fluorochrome. In other embodiments, spillover compensation is performed by the AutoSpill algorithm.

In some embodiments of the invention, a spillover spreading matrix composed of spillover spreading coefficients (obtained as discussed above) is calculated in conjunction with compensating the fluorescent flow cytometer data for spillover. This may be performed with or without the identification of positive and negative populations of fluorescent flow cytometer data with respect to each relevant fluorochrome. In some embodiments, calculation of a spillover spreading matrix in conjunction with spillover compensation is performed without identification of positive and negative populations. In such embodiments, the calculation of the spillover matrix and spillover compensation is performed by AutoSpill. In some embodiments, fluorescent flow cytometer data may additionally be adjusted to account for the error present in the data caused by spillover, if desired.

In other embodiments, calculation of a spillover spreading matrix in conjunction with spillover compensation is performed with identification of positive and negative populations. In such embodiments, spillover compensation may be performed by an algorithm other than AutoSpill. In embodiments, compensation is performed via unmixing. In some embodiments, fluorescent flow cytometer data may additionally be adjusted to account for the error present in the data caused by spillover, if desired.

Figure 9:
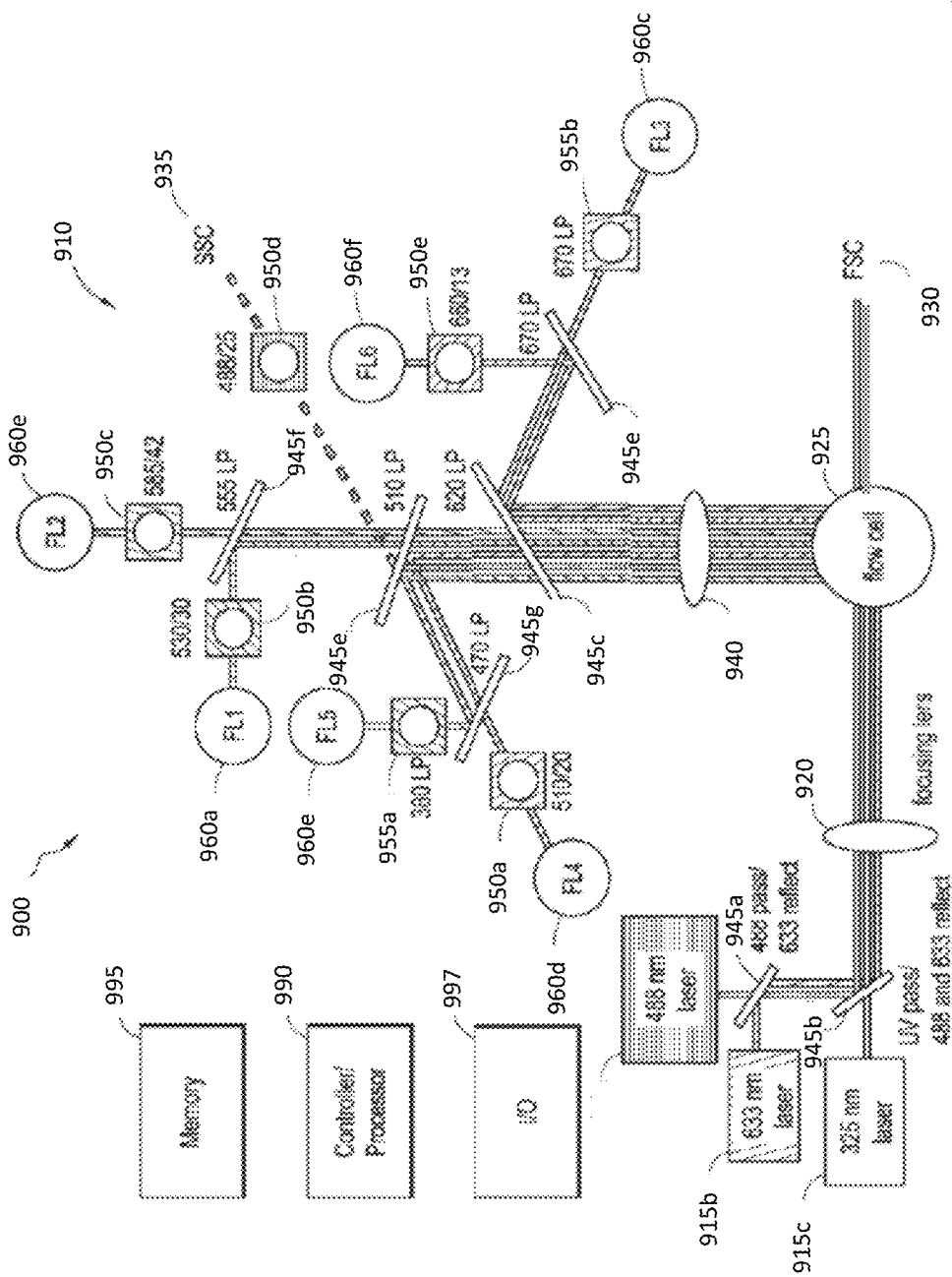
FIG. 9 depicts a flow cytometer according to certain embodiments.

FIG. 9 shows a system 900 for flow cytometry in accordance with an illustrative embodiment of the present invention. The system 900 includes a flow cytometer 910, a controller/processor 990 and a memory 995. The flow cytometer 910 includes one or more excitation lasers 915a-915c, a focusing lens 920, a flow chamber 925, a forward scatter detector 930, a side scatter detector 935, a fluorescence collection lens 940, one or more beam splitters 945a-945g, one or more bandpass filters 950a-950e, one or more longpass ("LP") filters 955a-955b, and one or more fluorescent light detectors 960a-960f.

The excitation lasers 915a-c emit light in the form of a laser beam. The wavelengths of the laser beams emitted from excitation lasers 915a-915c are 488 nm, 633 nm, and 325 nm, respectively, in the example system of FIG. 9. The laser beams are first directed through one or more of beam splitters 945a and 945b. Beam splitter 945a transmits light at 488 nm and reflects light at 633 nm. Beam splitter 945b transmits UV light (light with a wavelength in the range of 10 to 400 nm) and reflects light at 488 nm and 633 nm.

The laser beams are then directed to a focusing lens 920, which focuses the beams onto the portion of a fluid stream where particles of a sample are located, within the flow chamber 925. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 930, side scatter detector 935, and the one or more fluorescent light detectors 960a-960f through one or more of the beam splitters 945a-945g, the bandpass filters 950a-950e, the longpass filters 955a-955b, and the fluorescence collection lens 940.

The fluorescence collection lens 940 collects light emitted from the particle-laser beam interaction and routes that light towards one or more beam splitters and filters. Bandpass filters, such as bandpass filters 950a-950e, allow a narrow range of wavelengths to pass through the filter. For example, bandpass filter 950a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 955a-955b, transmit wavelengths of light equal to or longer than a specified wavelength of light. For example, longpass filter 955a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 905g is a 620 SP beam splitter, meaning that the beam splitter 945g transmits wavelengths of light that are 620 nm or shorter and reflects wavelengths of light that are longer than 620 nm in a different direction.

In one embodiment, the beam splitters 945*a*-945*g* can comprise optical mirrors, such as dichroic mirrors.

The forward scatter detector 930 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 935 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 960*a*-960*f*. The side scatter detector 935 and fluorescent light detectors can include photomultiplier tubes. The signals detected at the forward scatter detector 930, the side scatter detector 935 and the fluorescent detectors can be converted to electronic signals (voltages) by the detectors. This data can provide information about the sample.

In operation, cytometer operation is controlled by a controller/processor 990, and the measurement data from the detectors can be stored in the memory 995 and processed by the controller/processor 990. Although not shown explicitly, the controller/processor 990 is coupled to the detectors to receive the output signals therefrom, and may also be coupled to electrical and electromechanical components of the flow cytometer 900 to control the lasers, fluid flow parameters, and the like. Input/output (I/O) capabilities 997 may be provided also in the system. The memory 995, controller/processor 990, and I/O 997 may be entirely provided as an integral part of the flow cytometer 910. In such an embodiment, a display may also form part of the I/O capabilities 997 for presenting experimental data to users of the cytometer 900. Alternatively, some or all of the memory 995 and controller/processor 990 and I/O capabilities may be part of one or more external devices such as a general purpose computer. In some embodiments, some or all of the memory 995 and controller/processor 990 can be in wireless or wired communication with the cytometer 910. The controller/processor 990 in conjunction with the memory 995 and the I/O 997 can be configured to perform various functions related to the preparation and analysis of a flow cytometer experiment.

The system illustrated in FIG. 9 includes six different detectors that detect fluorescent light in six different wavelength bands (which may be referred to herein as a "filter window" for a given detector) as defined by the configuration of filters and/or splitters in the beam path from the flow cell 925 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 997 can be configured to receive data regarding a flow cytometer experiment having a panel of fluorescent labels and a plurality of cell populations having a plurality of markers, each cell population having a subset of the plurality of markers. The I/O 997 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 995. The controller/processor 990 can be configured to evaluate one or more assignments of labels to markers.

One of skill in the art will recognize that a flow cytometer in accordance with an embodiment of the present invention is not limited to the flow cytometer depicted in FIG. 9, but can include any flow cytometer known in the art. For example, a flow cytometer may have any number of lasers, beam splitters, filters, and detectors at various wavelengths and in various different configurations.

Figure 10:
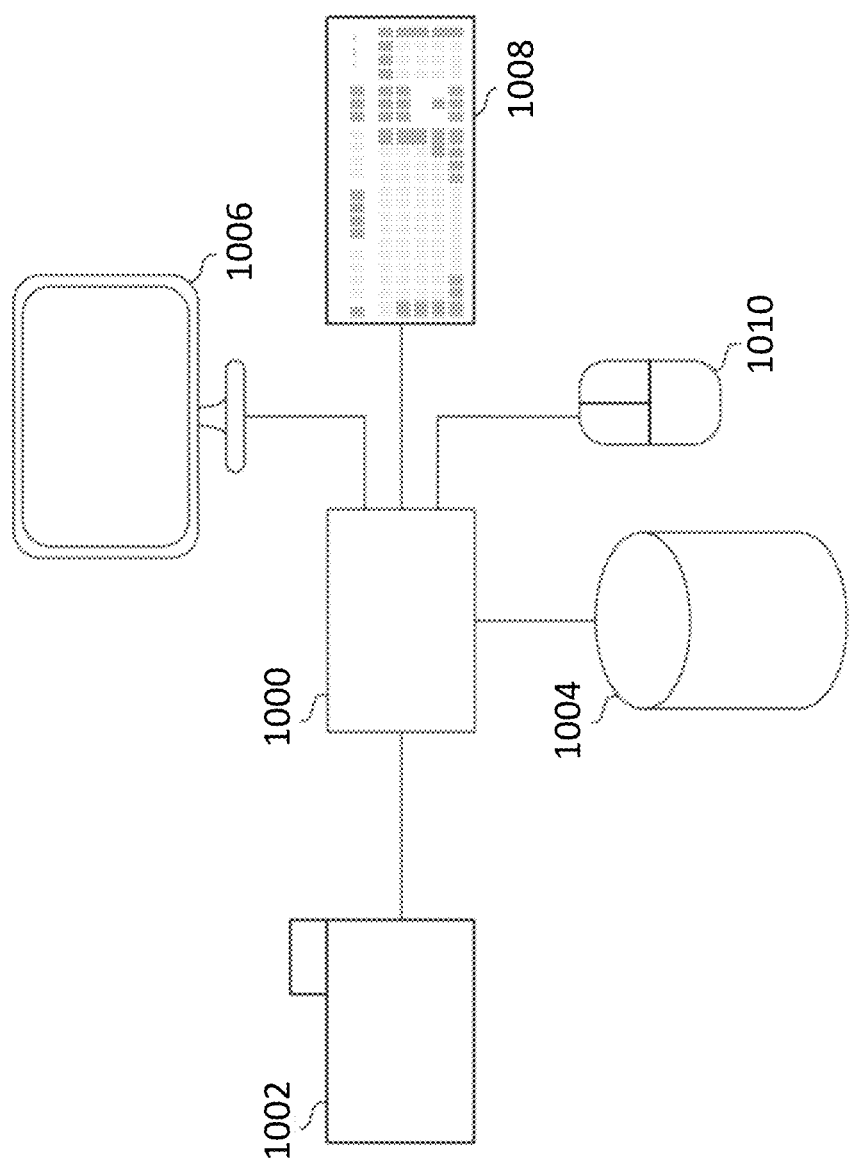
FIG. 10 depicts a functional block diagram for one example of a processor according to certain embodiments.

FIG. 10 shows a functional block diagram for one example of a processor 1000, for analyzing and displaying data. A processor 1000 can be configured to implement a variety of processes for controlling graphic display of biological events. A flow cytometer 1002 can be configured to acquire fluorescent flow cytometer data by analyzing a biological sample (e.g., as described above). The apparatus can be configured to provide biological event data to the processor 1000. A data communication channel can be included between the flow cytometer 1002 and the processor 1000. The data can be provided to the processor 1000 via the data communication channel. The processor 1000 can be configured to provide a graphical display including plots (e.g., as described above) to display 1006. The processor 1000 can be further configured to render a gate around populations of fluorescent flow cytometer data shown by the display device 1006, overlaid upon the plot, for example. In some embodiments, the gate can be a logical combination of one or more graphical regions of interest drawn upon a single parameter histogram or bivariate plot. In some embodiments, the display can be used to display analyte parameters or saturated detector data.

The processor 1000 can be further configured to display fluorescent flow cytometer data on the display device 1006 within the gate differently from other events in the fluorescent flow cytometer data outside of the gate. For example, the processor 1000 can be configured to render the color of fluorescent flow cytometer data contained within the gate to be distinct from the color of fluorescent flow cytometer data outside of the gate. In this way, the processor 1000 may be configured to render different colors to represent each unique population of data. The display device 1006 can be implemented as a monitor, a tablet computer, a smartphone, or other electronic device configured to present graphical interfaces.

The processor 1000 can be configured to receive a gate selection signal identifying the gate from a first input device. For example, the first input device can be implemented as a mouse 1010. The mouse 1010 can initiate a gate selection signal to the processor 1000 identifying the population to be displayed on or manipulated via the display device 1006 (e.g., by clicking on or in the desired gate when the cursor is positioned there). In some implementations, the first device can be implemented as the keyboard 1008 or other means for providing an input signal to the processor 1000 such as a touch-screen, a stylus, an optical detector, or a voice recognition system. Some input devices can include multiple inputting functions. In such implementations, the inputting functions can each be considered an input device. For example, as shown in FIG. 10, the mouse 1010 can include a right mouse button and a left mouse button, each of which can generate a triggering event.

The triggering event can cause the processor 1000 to alter the manner in which the fluorescent flow cytometer data is displayed, which portions of the data is actually displayed on the display device 1006, and/or provide input to further processing such as selection of a population of interest for analysis.

In some embodiments, the processor 1000 can be configured to detect when gate selection is initiated by the mouse 1010. The processor 1000 can be further configured to automatically modify plot visualization to facilitate the gating process. The modification can be based on the specific distribution of data received by the processor 1000.

The processor 1000 can be connected to a storage device 1004. The storage device 1004 can be configured to receive and store data from the processor 1000. The storage device 1004 can be further configured to allow retrieval of data, such as fluorescent flow cytometer data, by the processor 1000.

A display device 1006 can be configured to receive display data from the processor 1000. The display data can comprise plots of fluorescent flow cytometer data and gates outlining sections of the plots. The display device 1006 can be further configured to alter the information presented according to input received from the processor 1000 in conjunction with input from apparatus 1002, the storage device 1004, the keyboard 1008, and/or the mouse 1010.

In some implementations the processor 1000 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for receiving fluorescent flow cytometer data containing intensity signals collected from at least a first and second fluorochrome, partitioning the fluorescent flow cytometer data according to the intensity of the fluorescent flow cytometer data relative to the first fluorochrome, estimating with a first linear regression a zero-adjusted standard deviation for the intensity of light collected from the second fluorochrome for each of the partitioned quantiles based on the assumption that the intensity of light collected from the first fluorochrome is zero, obtaining with a second linear regression a spillover spreading coefficient from the zero-adjusted standard deviations to characterize spillover spreading originating from the first fluorochrome in flow cytometer data obtained for the second fluorochrome, assembling spillover spreading coefficients calculated for each pair of first and second fluorochromes in a spillover spreading matrix, and adjusting the fluorescent flow cytometer data based on the spillover spreading matrix.

In embodiments, the system is configured to analyze the data within a software or an analysis tool for analyzing flow cytometer data, such as FlowJo® (Ashland, OR). FlowJo® is a software package developed by FlowJo LLC (a subsidiary of Becton Dickinson) for analyzing flow cytometer data. The software is configured to manage flow cytometer data and produce graphical reports thereon (https://www(dot)flowjo(dot)com/learn/flowjo-university/flowjo). The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT, Windows XP, Windows 7, Windows 8, iOS, Sun Solaris, Linux, OS/400, Compaq Tru64 Unix, SGI IRIX, Siemens Reliant Unix, and others.

Figure 11:
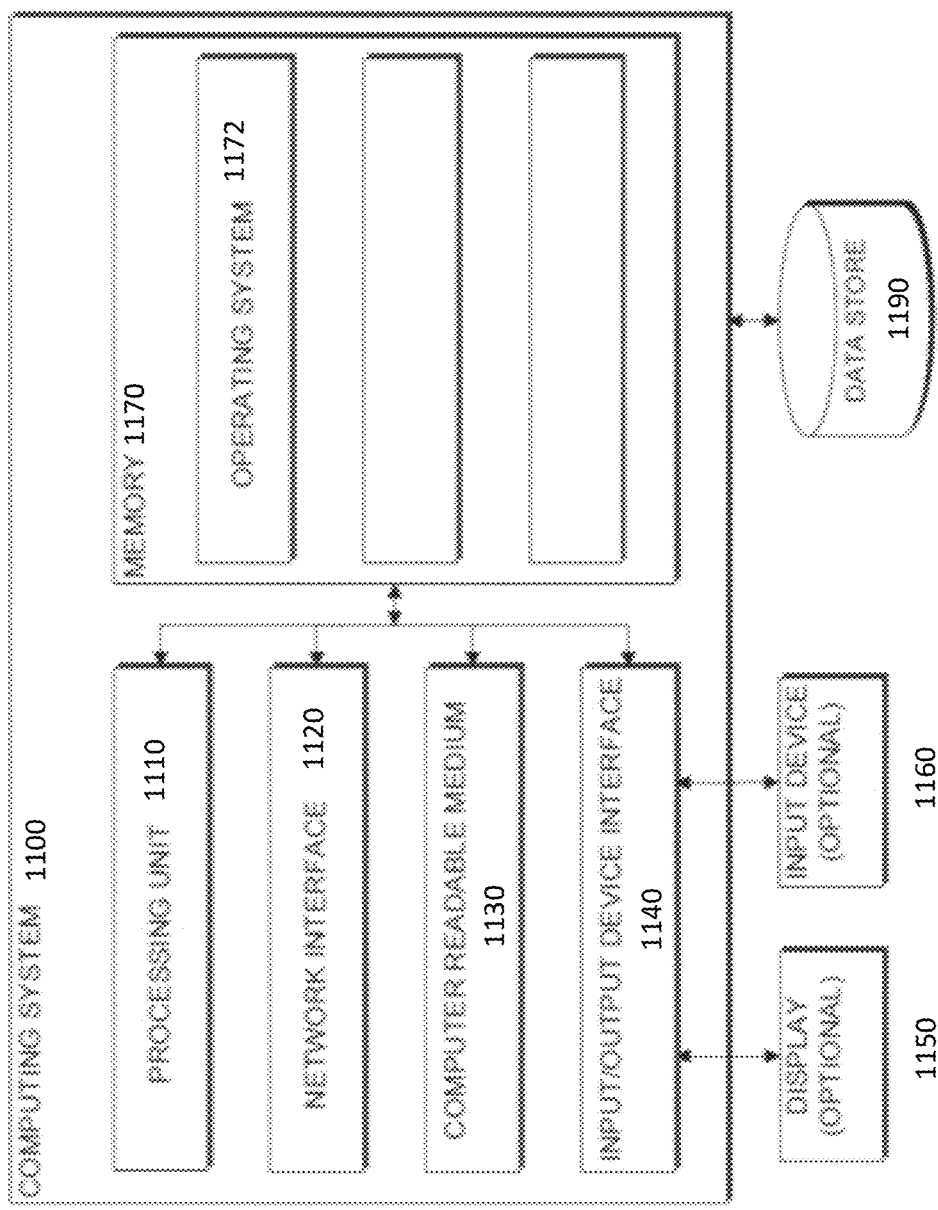
FIG. 11 depicts a block diagram of a computing system according to certain embodiments.

FIG. 11 depicts a general architecture of an example computing device 1100 according to certain embodiments. The general architecture of the computing device 1100 depicted in FIG. 11 includes an arrangement of computer hardware and software components. It is not necessary, however, that all of these generally conventional elements be shown in order to provide an enabling disclosure. As illustrated, the computing device 1100 includes a processing unit 1110, a network interface 1120, a computer readable medium drive 1130, an input/output device interface 1140, a display 1150, and an input device 1160, all of which may communicate with one another by way of a communication bus. The network interface 1120 may provide connectivity to one or more networks or computing systems. The processing unit 1110 may thus receive information and instructions from other computing systems or services via a network. The processing unit 1110 may also communicate to and from memory 1170 and further provide output information for an optional display 1150 via the input/output device interface 1140. For example, an analysis software (e.g., data analysis software or program such as FlowJo®) stored as executable instructions in the non-transitory memory of the analysis system can display the flow cytometry event data to a user. The input/output device interface 1140 may also accept input from the optional input device 1160, such as a keyboard, mouse, digital pen, microphone, touch screen, gesture recognition system, voice recognition system, gamepad, accelerometer, gyroscope, or other input device.

The memory 1170 may contain computer program instructions (grouped as modules or components in some embodiments) that the processing unit 1110 executes in order to implement one or more embodiments. The memory 1170 generally includes RAM, ROM and/or other persistent, auxiliary or non-transitory computer-readable media. The memory 1170 may store an operating system 1172 that provides computer program instructions for use by the processing unit 1110 in the general administration and operation of the computing device 1100. Data may be stored in data storage device 1190. The memory 1170 may further include computer program instructions and other information for implementing aspects of the present disclosure.

Computer-Readable Storage Media

Aspects of the present disclosure further include non-transitory computer readable storage media having instructions for practicing the subject methods. Computer readable storage media may be employed on one or more computers for complete automation or partial automation of a system for practicing methods described herein. In some embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. In some instances, instructions may be provided on an integrated circuit device. Integrated circuit devices of interest may include, in certain instances, a reconfigurable field programmable gate array (FPGA), an application specific integrated circuit (ASIC) or a complex programmable logic device (CPLD). A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions for receiving fluorescent flow cytometer data containing intensity signals collected from at least a first and second fluorochrome, partitioning the fluorescent flow cytometer data according to the intensity of the fluorescent flow cytometer data relative to the first fluorochrome, estimating with a first linear regression a zero-adjusted standard deviation for the intensity of light collected from the second fluorochrome for each of the partitioned quantiles based on the assumption that the intensity of light collected from the first fluorochrome is zero, obtaining with a second linear regression a spillover spreading coefficient from the zero-adjusted standard deviations to characterize spillover spreading originating from the first fluorochrome in flow cytometer data obtained for the second fluorochrome, assembling spillover spreading coefficients calculated for each pair of first and second fluorochromes in a spillover spreading matrix, and adjusting the fluorescent flow cytometer data based on the spillover spreading matrix.

In embodiments, the system is configured to analyze the data within a software or an analysis tool for analyzing flow cytometer data, such as FlowJo®. The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

The computer readable storage medium may be employed on more or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, Python, C++, other high level or low level languages, as well as combinations thereof, as is known in the art. The operating system also provides scheduling, input-output control, file and data management, memory management, and communication control and related services, all in accordance with known techniques.

Utility

The subject devices, methods and computer systems find use in a variety of applications where it is desirable to increase resolution and accuracy in the determination of parameters for analytes (e.g., cells, particles) in a biological sample. For example, the present disclosure finds use in analyzing data that is affected by spillover spreading. Because flow cytometry often involves the collection of multiple fluorescent parameters by multiple detectors, detected fluorescent light intensities may be erroneously increased due to the same light being detected by multiple detectors. As such, the present disclosure finds use during the analysis of flow cytometer data that contains signals from multiple fluorochromes. The subject devices, methods and computer systems particularly find use in characterizing spillover spreading in flow cytometer data that has poorly defined positive and negative populations. In some embodiments, the subject methods and systems provide fully automated protocols so that adjustments to data require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include storage media such as a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the program storage media include instructions for clustering fluorescent flow cytometer data into populations, determining the spillover spreading of the populations, adjusting flow cytometer data based on spillover spreading, as well as determining partitions between the adjusted flow cytometer data (e.g., as described above). In embodiments, the instructions contained on computer readable media provided in the subject kits, or a portion thereof, can be implemented as software components of a software for analyzing data, such as FlowJo®. In these embodiments, computer-controlled systems according to the instant disclosure may function as a software "plugin" for an existing software package, such as FlowJo®.

In addition to the above components, the subject kits may further include (in some embodiments) instructions, e.g., for installing the plugin to the existing software package such as FlowJo®. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

EXPERIMENTAL

Datasets

MM1 dataset (mouse splenocytes): For single stain controls, splenocytes from C57Bl/6 mice were disrupted with glass slides, filtered through 100 μm mesh, and red blood cells lysed. Cells were fixed and permeabilized with Foxp3 Transcription Factor Staining Buffer Set (eBioscience) according to the manufacturer's instructions, and stained overnight at 4° C. with Fixable Viability Dye eFluor780 (eBioscience) or the following antibodies: anti-CD4-BV421, anti-CD24-BV510, anti-CD3-BV570, anti-CD4-BV605, anti-CD3-BV650, anti-CD4-BV711, anti-CD4-BV785, anti-CD3-AF488/anti-CD4-AF488/anti-TCRP-AF488, anti-CD4-PerCP-Cy5.5, anti-CD4-PE-594, anti-CD8-PE-Cy7, anti-MHC-II-AF700 (all Biolegend), anti-CD19-BV750, anti-CD3-BB630-P/anti-Thy1.2-BB630-P, anti-CD45.2-BB660-P2/anti-CD3-BB660-P2, anti-TCRb-BB790-P/anti-CD45-BB790-P, anti-CD4-BUV395, anti-CD4-BUV496, anti-CD3-BUV563, anti-CD3-BUV615-P, anti-CD19-BUV661, anti-CD21-BUV737, anti-CD8-BUV805 (all BD Biosciences), anti-CD4-PE/anti-CD3-PE/anti-CD8-PE, anti-IgM-PE-Cy5, anti-CD3-PE-Cy5.5 or anti-CD4-APC/anti-CD8-APC (all eBioscience). For some fluorophores, multiple antibodies were used in the same compensation control, which is indicated by slashes. Samples were acquired on a Symphony flow cytometer (BD Biosciences).

HS1 dataset (human PBMCs): Peripheral blood mononuclear cells (PBMC) were isolated from heparinized blood samples of human healthy donors using Ficoll-Paque density centrifugation (MP biomedicals), frozen and then stored in liquid nitrogen. Frozen PBMCs were thawed and counted, and cell concentration was adjusted to $1 \times 10^6$ for each single-color control. Cells were plated in a V-bottom 96-well plate, washed once with PBS (Fisher Scientific) and stained with live/dead marker and fluorochrome-conjugated antibodies against surface markers: anti-CD8-BUV805, anti-CD4-BUV496, anti-CD95-BUV737, anti-CD4-BUV615-P, anti-CD28-BB660-P, anti-CD4-BB630, anti-CD4-BV750-P, anti-CD31-BV480, anti-CXCR5-BV650, anti-CD4-PE, anti-CD4-PE-Cy5 (all BD Biosciences); anti-CD3-PerCP-Vio700 (Miltenyi Biotec); anti-CD3-FITC, anti-CD4-PE-Cy5.5, anti-CCR7-PE-Cy7, anti-CD4-eFluor780 (all eBioscience); anti-CD4-BV786, anti-CD4-BV711, anti-CD4-BV605, anti-HLA-DR-BV570, anti-CD127-BV421, anti-CD4-PE/Dazzle 594, anti-CD4-AF647 (all BioLegend).

Samples were stained for 60 min at 4° C., washed twice in PBS/1% FBS (Tico Europe), and then fixed and permeabilized with Foxp3 Transcription Factor Staining Buffer Set (eBioscience), according to manufacturer's instructions. Cells were stored overnight at 4° C. and were then acquired on a Symphony flow cytometer with Diva software (BD Biosciences). A minimum of $5 \times 10^4$ events were acquired for each sample.

HS2 dataset (human PBMCs): Frozen PBMCs from human healthy donors were processed as for the HS1 set and stained with live/dead marker and fluorochrome-conjugated antibodies against the following surface markers: anti-CD8-BUV805, anti-CD4-BUV496, anti-CD95-BUV737, anti-CD28-BB660-P, anti-ICOS-BB630, anti-CXCR3-BV785, anti-PD-1-BV750-P, anti-CXCR5-BV650, anti-CCR2-BV605, (all BD Biosciences); anti-CD3-PerCP-Vio700 (Miltenyi Biotec); anti-CD45RA-FITC, anti-CD14-PE-Cy5.5, fixable viability dye eFluor780 (all eBioscience); anti-CD25-BV711, anti-CD31-BV480, anti-HLA-DR{BV570, anti-CD127{BV421, anti-CCR4-PE/Dazzle 594, anti-CCR7-PE-Cy7 (all BioLegend).

Samples were stained for 60 min at 4° C., washed twice in PBS/1% FBS (Tico Europe), and then fixed and permeabilized with Foxp3 Transcription Factor Staining Buffer Set (eBioscience), according to manufacturer's instructions. Cells were stained overnight at 4° C. with anti-Ki67-BUV615-P, anti-CTLA-4-PE-Cy5, anti-RORt-PE (BD Biosciences) and anti-FOXP3-AF647 (BioLegend) anti-human intracellular antibody. Samples were acquired on a Symphony flow cytometer (BD Biosciences).

Be1 dataset (beads): UltraComp eBeads. Compensation Beads (ThermoFisher) were used to optimize fluorescence compensation settings for multi-color ow cytometric analysis at a Symphony flow cytometer. UltraComp eBeads. were stained with the following fluorochrome-labeled anti-human antibodies: anti-CD8-BUV805, anti-CD4-BUV496, anti-CD86-BUV737, anti-CD141-BUV615-P, anti-CD56-BUV563, anti-CD16-BUV395, anti-CD123-BB660-P, anti-CD80-BB630, anti-CD21-BV785, anti-CD27-BV750-P, anti-BAFF-R-BV650, anti-CD94-BV605, anti-CD40-APC-R700 (all BD bioscience); anti-CD3-PerCP-Vio700 (MiltenyiBiotec); anti-CD57-FITC, anti-CD14-PE-Cy5.5, fixable viability dye eFluor780 (all eBioscience); anti-CD24-BV711, anti-CD19-BV480, anti-HLA-DR-BV570, anti-IgM-BV421, anti-CD11c-APC, anti-CD38-PE/Dazzle 594, anti-CD10-PE-Cy5, anti-IgD-PE-Cy7 (all BioLegend).

Initial Gatinq

Tessellation was carried out with the package tripack v.1.3-9, whereas density estimation and spatial operations were done with packages fields v.10.3 and sp v.1.4-1. The initial gate was calculated independently for each control, over the 2d-density of events on forward and side scatter (FSC-A and SSC-A parameters). To robustly detect the population of interest, 2-step tessellation was carried out to isolate the desired density peak. First, data was trimmed on extreme values (1% and 99%). Then, maxima were located numerically by a moving average (window size 3) on a soft estimation of the 2d-density. The first tessellation was carried out on these density maxima, and the tile corresponding to the highest maximum was selected, ignoring peaks close to lower values of both FSC-A and SSC-A. A rectangular region in the FSC-A/SSC-A-plane was chosen by using the median and 3× the mean absolute deviation of the events contained in the selected tile. A second, finer 2d-density estimation was carried out on this region, followed again by numerical detection of maxima (window size 2) and tessellation by the maxima. Finally, the gate was defined as the convex hull enclosing the points that both had a density larger than a threshold (33% of maximum as default value) and belonged to the tile containing the highest maximum.

Methods

Characterization of spillover spreading was implemented in R v.3.6.3, using the packages flowCore v.1.50.0, flowWorkspace v.3.32.0, and ggplot2 v.3.3.0. Spillover spreading is defined as the incremental increase in standard deviation of fluorescent intensity in one parameter caused by the increase in fluorescent intensity of another parameter. The spillover spreading coefficients can be calculated by comparing the fluorescent intensity in the primary detector to the standard deviation of fluorescence in the secondary detector, for a pair of positive and negative populations in a single-color control corresponding to the primary detector (Nguyen et al., 2013).

The traditional formula for an SSM coefficient $SS_C^P$ characterizes the incremental standard deviation induced in parameter C by the spillover from parameter P (Nguyen et al., 2013), $$SS_C^P = \frac{\sqrt{\sigma^2_{positive} - \sigma^2_{negative}}}{\sqrt{F_{positive} - F_{negative}}}$$

where $\sigma_{positive}$ and $\sigma_{negative}$ are the standard deviations in C-fluorescence in a positive and negative population, respectively, and $F_{positive} - F_{negative}$ is the difference in P-fluorescence intensity between them. While the traditional algorithm estimates the above quantities using medians and robust standard deviations of fluorescence in the positive and negative populations, for the sake of linear regression, let the negative be the theoretical quantity when P-fluorescence (F) is equal to zero, while the standard deviation is an unknown quantity ($\sigma_0$). This results in following equation relating F to $\sigma$, which is suitable for estimating $\sigma_0$ by linear regression:

$$\sigma = \sqrt{F}\beta + \sigma_0$$

The slope $\beta$ is not equal to the spillover spreading coefficient $SS_C^P$, except in the unique case where $\sigma_0$ equals zero.

To supply data for the regression, the events of the single color-color control for parameter P were partitioned by quantile. For controls with a large number of events, 256 quantiles were used, but as few as 8 may be used to ensure there are enough events in each quantile to estimate standard deviation reliably. For each other parameter C, the robust standard deviation of fluorescence (the $84^{th}$ percentile minus the median) was calculated as the estimate of a, and the median fluorescence as the estimate of F. The F values may be negative and/or close to zero, so they were passed through a square-root-like transform defined by f $\sqrt{\ }(x)=sign(x)(\sqrt{|x|+1}-1)$ prior to regression, instead of the simple square root function. The resulting regression provided an estimate of $\sigma_0$.

Using the estimate of $\sigma_0$, the estimation of zero-adjusted standard deviation $\sigma'$ defined by $\sigma'=f\sqrt{\ }(\sigma^2-\sigma_0^2)$ was calculated for each quantile, and these adjusted standard deviations provided the data for the second regression, $\sigma' = \sqrt{F}SS_C^P$. This regression was calculated without an intercept term because the adjustment of $\sigma_0$ forces it to zero.

Results

Here, quantile partitioning, and linear regression were used to estimate the linear relationship observed by Nguyen et al, thereby allowing the inclusion of events above, below, or in-between the positive and negative populations of the original approach. The events of each single-color control were partitioned quantile-wise in the primary detector, and the standard deviation of the level of autofluorescence was estimated, for each quantile bin, in every secondary detector.

Figure 12:
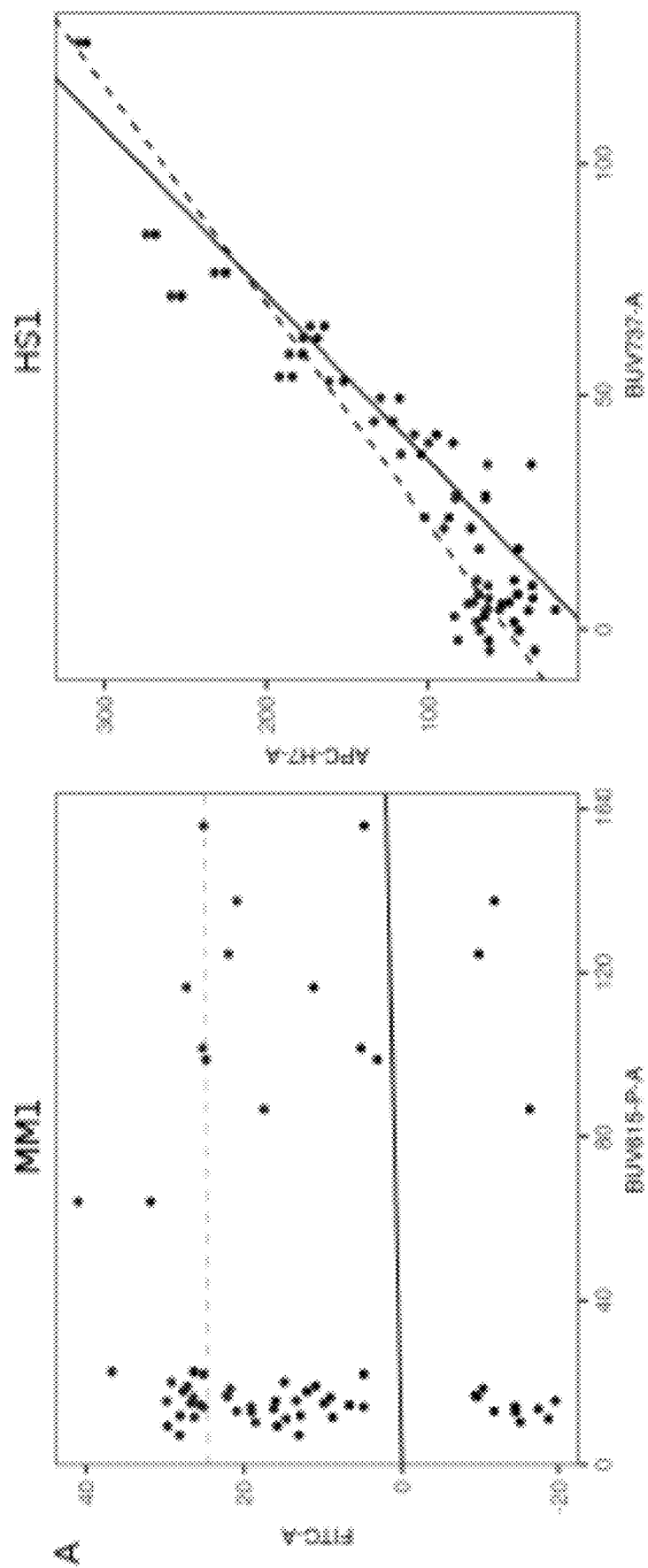
FIG. 12 depicts regression analyses carried out for compensated and uncompensated data according to embodiments of the instant method.

Next, two linear regressions were used to estimate, first, the standard deviation at zero fluorescence, and then the spillover spreading coefficient. Coefficients deemed non-significant using an F-test were replaced with zeros, as were any negative coefficients. The majority of quantiles were, in fact, subsamples of the traditional positive and negative populations, but the inclusion of additional quantiles improved the precision in estimating spillover spreading effects, because all these events conform to the same linear relationship, assuming that they are on-scale and in the linear range of the flow cytometer (FIG. 12). As depicted in FIG. 12, regression analysis was carried out for control sets MM1 (left) and HS1 (right) over the gated events of one single-color control of each set, with no well-defined positive and negative populations, with the main and secondary channels as indicated, respectively, in the y- and x-axes. Uncompensated data points are displayed in blue and compensated ones in black. Regression from uncompensated data is displayed with dashed lines, while regression from compensated data is displayed with solid lines.

As a result, spillover spreading for datasets whose compensation matrices successfully orthogonalized the fluorescent signals present in the single-color controls were accurately estimated (FIG. 13). As shown in FIG. 13, results are compared between the instant method and the usual spillover spreading matrix algorithm for control sets MM1 (left) and HS1 (right), showing the small difference between both calculations. Values are displayed in log-scale of the absolute value of the difference, separated in positive (solid lines) and negative (dashed lines) values.

The adjustment step (the first regression) removed the minor quadratic effect caused by $\sigma_0$ in the initial estimates, thereby allowing for more accurate estimation of the SS coefficients. If this adjustment step were skipped, that is, if the $\beta$'s were taken as the spillover spreading coefficients, then spreading effects would be consistently underestimated. In that case, comparison against the traditional SSM algorithm would show a clear negative bias (FIG. 14). Including the adjustment step eliminated that bias. As shown in FIG. 14, results obtained between the instant method and the usual SSM algorithm for control sets MM1 (left) and HS1 (right) are compared, but with the omission of the first linear regression in the instant method, which leads to a systematic downward bias in the coefficients obtained with it. Scale and line code are the same as in FIG. 13.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of characterizing spillover spreading originating from a first fluorochrome in flow cytometer data obtained for a second fluorochrome, the method comprising, with a processor:

partitioning fluorescent flow cytometer data comprising intensity signals collected from light emitted by the first fluorochrome and the second fluorochrome into a number of quantiles according to the intensity of the fluorescent flow cytometer data relative to the first fluorochrome;

estimating with a first linear regression a zero-adjusted standard deviation for the intensity of light collected from the second fluorochrome for each of the partitioned quantiles based on an assumption that the intensity of light collected from the first fluorochrome is zero;

obtaining with a second linear regression a spillover spreading coefficient from the zero-adjusted standard deviations to characterize the spillover spreading originating from the first fluorochrome in flow cytometer data obtained for the second fluorochrome;

adjusting the fluorescent flow cytometer data based on the spillover spreading coefficient from the zero-adjusted standard deviations to remove the spillover spreading originating from the first fluorochrome in the flow cytometer data obtained for the second fluorochrome; and displaying on a display device the first linear regression or the second linear regression comprising the adjusted flow cytometric data.

2. The method according to claim 1, wherein the first linear regression comprises calculating a linear fit between a square root of a median intensity of light collected from the first fluorochrome and a standard deviation of the intensity of light collected from the second fluorochrome.

3. The method according to claim 2, wherein estimating the zero-adjusted standard deviation further comprises calculating a standard deviation of the intensity of light emitting from the second fluorochrome based on the assumption that the intensity of light collected from the first fluorochrome is zero by determining a y-intercept of the linear fit calculated between the square root of the median intensity of light collected from the first fluorochrome and the standard deviation of the intensity of light collected from the second fluorochrome, and adjusting the standard deviation for the intensity of light collected from the second fluorochrome based on the determined y-intercept.

4. The method according to claim 1, wherein the second linear regression comprises calculating for each partitioned quantile a linear fit between the zero-adjusted standard deviations and a median intensity of light collected from the first fluorochrome.

5. The method according to claim 4, wherein obtaining the spillover spreading coefficient comprises obtaining a slope of the linear fit calculated between the zero-adjusted standard deviations and the median intensity of light collected from the first fluorochrome.

6. The method according to claim 1, wherein the spillover spreading coefficient is computed according to Equation 1:

$$SS = \frac{\sqrt{\sigma^2 - \sigma_0^2}}{\sqrt{F}}$$

wherein:
SS is the spillover spreading coefficient;
$\sigma$ is the standard deviation of light collected from the second fluorochrome;
$\sigma_0$ is the estimate of the standard deviation of the intensity of light collected from the second fluorochrome based on the assumption that the intensity of light collected from the first fluorochrome is zero; and
F is the median intensity of light collected from the first fluorochrome.

7. The method according to claim 1, wherein the first linear regression is chosen from an ordinary least squares model, a weighted least squares model, and a robust linear model.

8. The method according to claim 1, wherein the second linear regression is chosen from an ordinary least squares model, a weighted least squares model, and a robust linear model.

9. The method according to claim 1, wherein the first and second linear regressions are weighted least squares models.

10. The method according to claim 1, wherein the first and second linear regressions are robust linear models.

11. The method according to claim 1, further comprising combining the first and second linear regressions in a combined linear regression model configured to calculate a linear fit between a square of a standard deviation of the intensity of light collected from the second fluorochrome and a median intensity of light collected from the first fluorochrome.

12. The method according to claim 11, wherein the combined linear regression model is configured to calculate the standard deviation of the intensity of light collected from the second fluorochrome based on the assumption that the intensity of light collected from the first fluorochrome is zero and obtain the spillover spreading coefficient simultaneously.

13. The method according to claim 11, wherein the combined linear regression model is chosen from a weighted least squares model and a robust linear model.

14. The method according to claim 1, wherein the number of quantiles is determined based on a size of the fluorescent flow cytometer data.

15. The method according to claim 1, further comprising receiving the fluorescent flow cytometer data by:
irradiating a sample comprising particles flowing in a flow stream;
detecting fluorescent light from the sample comprising particles in the flow stream;
obtaining fluorescent flow cytometer data for the sample, wherein the fluorescent flow cytometer data comprises intensity signals collected from the light emitted by the first fluorochrome and the second fluorochrome from particles irradiated in the sample flowing in the flow stream.

16. The method according to claim 1, wherein the fluorescent flow cytometer data is collected from light emitting from a plurality of different fluorochromes.

17. The method according to claim 16, further comprising computing a spillover spreading coefficient for each pair of first and second fluorochromes in the plurality of fluorochromes.

18. The method according to claim 17, wherein the spillover spreading coefficients calculated for each pair of first and second fluorochromes in the plurality of fluorochromes are combined in a spillover spreading matrix.

19. The method according to claim 18, further comprising adjusting the flow cytometer data based on the spillover spreading matrix.

20. The method according to claim 1, further comprising calculating a fluorescence spillover matrix.

21. The method according to claim 1, wherein the first linear regression is estimated, and the second linear regression is obtained, based on identical fluorescent flow cytometer data.

22. The method according to claim 1, wherein a fluorescence spillover matrix is determined without requiring an identification of populations of fluorescent flow cytometer data that are positive for a particular fluorochrome and populations of fluorescent flow cytometer data that are negative for a particular fluorochrome.

23. The method according to claim 1, wherein the spillover spreading coefficient from the zero-adjusted standard deviations is obtained without requiring an identification of a population of fluorescent flow cytometer data that is positive for a particular fluorochrome.

24. The method according to claim 1, wherein the spillover spreading coefficient from the zero-adjusted standard deviations is obtained without identification of a population of fluorescent flow cytometer data that is negative for a particular fluorochrome.

* * * * *